April 8, 1958 E. HAJOS 2,829,451
MACHINE FOR STORING AND FEEDING ARTICLES OF LINEN
Filed Aug. 4, 1953 13 Sheets-Sheet 1

INVENTOR.
EUGENE HAJOS
BY Mock & Blum
ATTORNEYS

April 8, 1958 E. HAJOS 2,829,451
MACHINE FOR STORING AND FEEDING ARTICLES OF LINEN
Filed Aug. 4, 1953 13 Sheets-Sheet 3

INVENTOR.
EUGENE HAJOS
BY Mock & Blum
ATTORNEYS

INVENTOR.
EUGENE HAJOS
BY
ATTORNEYS

April 8, 1958 E. HAJOS 2,829,451
MACHINE FOR STORING AND FEEDING ARTICLES OF LINEN
Filed Aug. 4, 1953 13 Sheets-Sheet 6

INVENTOR.
EUGENE HAJOS
BY Mock & Blum
ATTORNEYS

April 8, 1958 E. HAJOS 2,829,451
MACHINE FOR STORING AND FEEDING ARTICLES OF LINEN
Filed Aug. 4, 1953 13 Sheets-Sheet 7
FIG. 12.
FIG. 11.
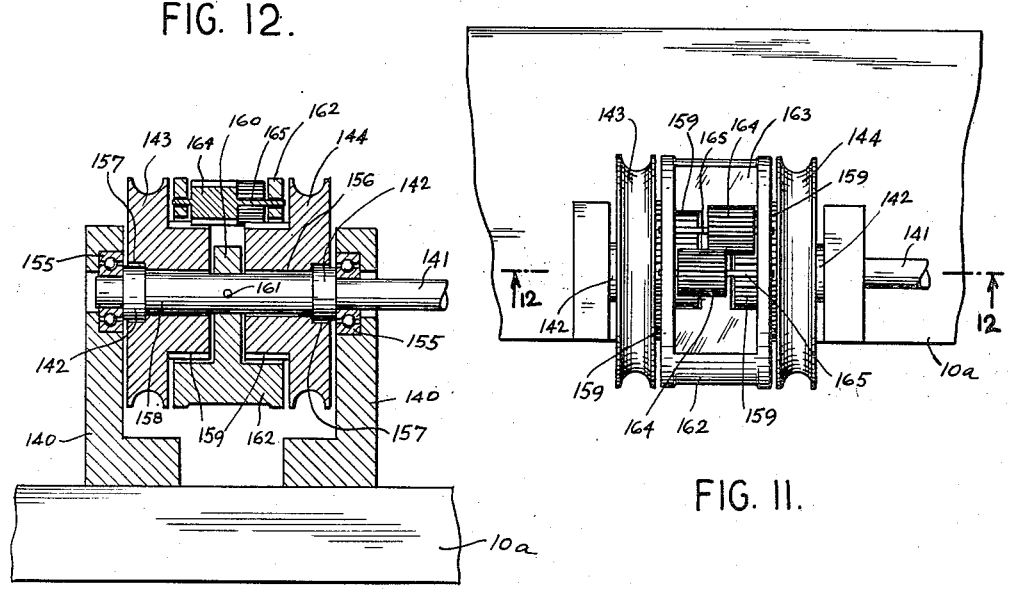
FIG. 13.
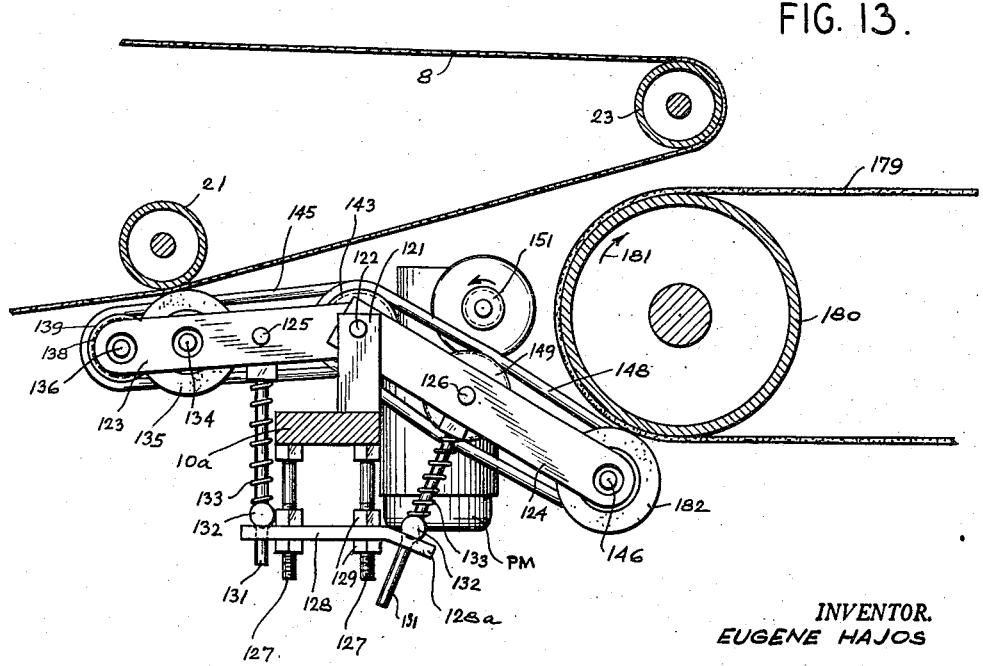
INVENTOR.
EUGENE HAJOS
BY Mock & Blum
ATTORNEYS April 8, 1958      E. HAJOS      2,829,451

MACHINE FOR STORING AND FEEDING ARTICLES OF LINEN

Filed Aug. 4, 1953      13 Sheets-Sheet 8

INVENTOR.
EUGENE HAJOS

BY *Mock & Blum*

ATTORNEYS

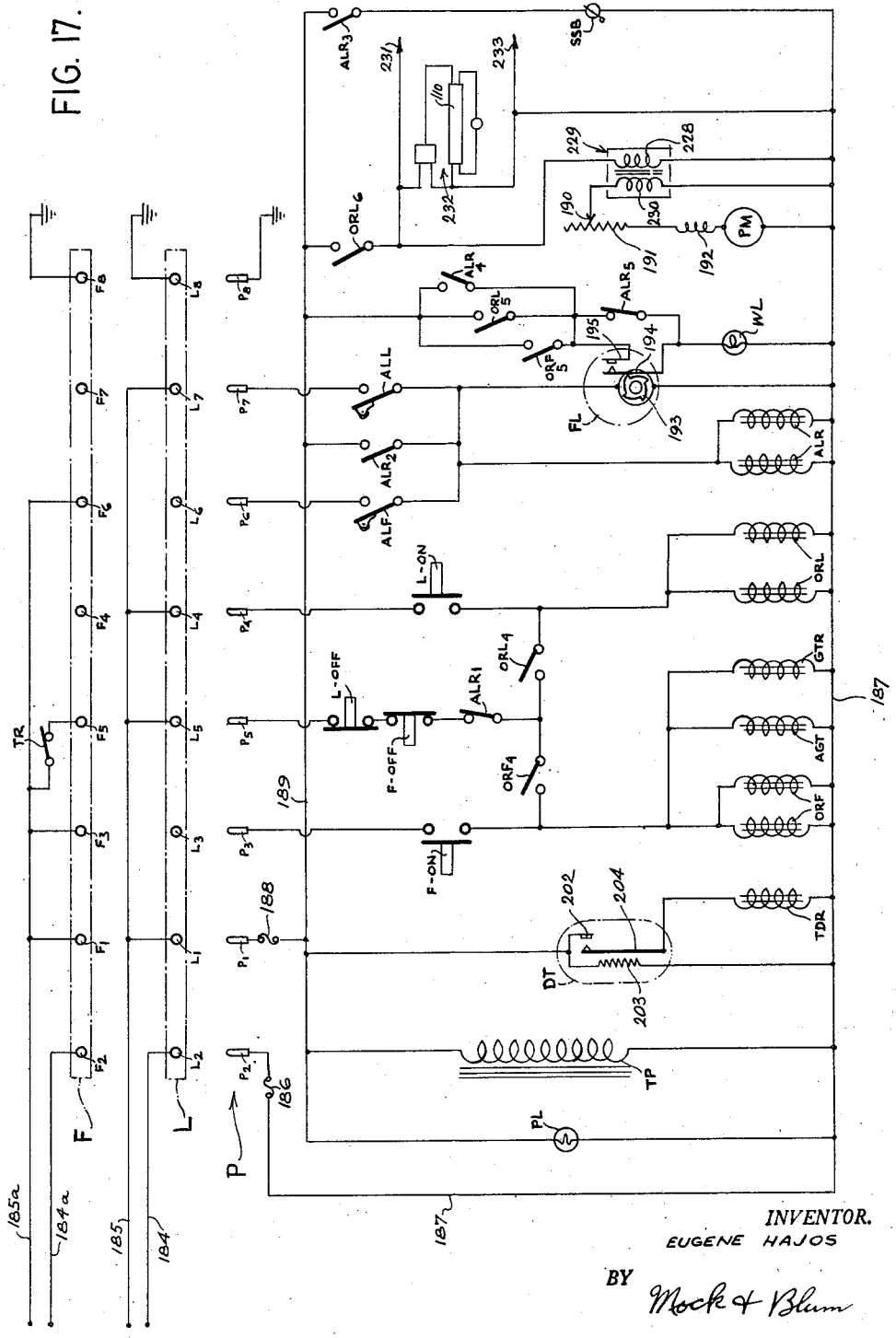

INVENTOR.
EUGENE HAJOS

INVENTOR.
EUGENE HAJOS

April 8, 1958          E. HAJOS          2,829,451

MACHINE FOR STORING AND FEEDING ARTICLES OF LINEN

Filed Aug. 4, 1953          13 Sheets-Sheet 12

INVENTOR
EUGENE HAJOS
BY
ATTORNEYS

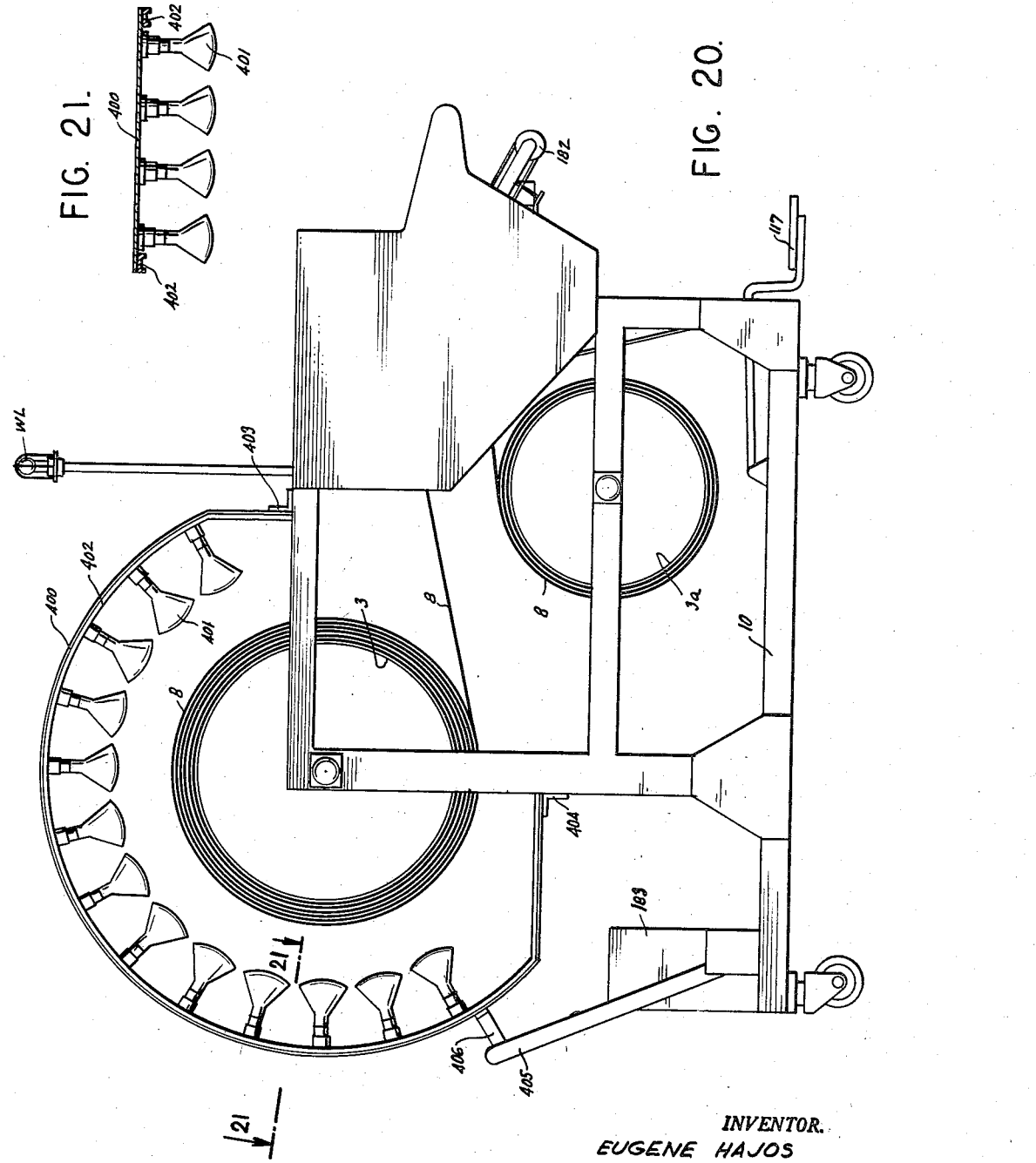

United States Patent Office 2,829,451
Patented Apr. 8, 1958

2,829,451

MACHINE FOR STORING AND FEEDING ARTICLES OF LINEN

Eugene Hajos, Fort Lee, N. J., assignor to Premier Laundry, Inc., New York, N. Y., a corporation of New York Application August 4, 1953, Serial No. 372,365

49 Claims. (Cl. 38—8)

This invention relates to an improved machine and method for storing and feeding articles of linen and the like.

The commercial laundry industry has devoted a great deal of effort to the development of new methods and machines for performing the operations involved in the assembly-line laundering of so-called "flat" articles of linen and the like, such as towels, pillow cases and sheets. Some of these operations include washing the articles, drying the articles, inspecting the articles for flaws, ironing the articles and folding the articles. Various stacking and feeding operations are involved in the aforesaid major operations.

It is well known that the operation of ironing articles of linen has been solved by the development and use on a wide scale of automatic ironing machines. These machines, which are capable of high capacity and efficiency, are accordingly large, complex and costly. However, each ironing machine requires the use of one or more human operators, who stand at the input or feeding conveyors of the machine and manually lift articles of linen from stacks and place them successively on said feeding conveyors. The human operators are far slower than the machines and, as a result, it has heretofore been necessary to operate the ironing machines at speeds far slower than their potential speeds, so that the operators could keep up with the machines.

Attempts have been made to develop mechanical devices for successively feeding articles of linen from a stack to a conveyor, but such devices have not proved operatively or commercially successful. My solution of the problem in complete contrast, involves the provision of several storage machines corresponding to each feeding conveyor of an ironing machine. Operators load articles of linen from stacks onto the conveyors of these storage machines in the conventional manner, the conveyors moving at speeds suited to the abilities of the operators. The loading operations may be performed at loading stations located away from the ironing machine. Each of the machines is adapted to be moved from its loading station to a feeding conveyor of the ironing machine, where the loaded contents of the storage machine may be fed to the feeding conveyor at a very rapid rate. In this way, a storage machine may always be stationed at each feeding conveyor of an ironing machine, feeding articles of linen to the ironing machine just as fast as it can process them. In the meantime, the remaining storage machines can be loaded at leisure by the operators. This makes it possible to obtain greater output from fewer ironing machines, with considerable resulting economies because of the far lower cost of the storage machines.

The machine in accordance with my invention includes a conveyor web, apron or tape, which may be a half mile long, and which is mounted on a pair of respective loading and feeding drums supported by a frame. A loading electric motor is coupled to the loading drum for turning same to move the tape at a relatively low rate of speed in a loading direction to wind it upon the loading drum and unwind it from the feeding drum. During this time, the operator feeds articles of linen successively onto the tape so that they are stored upon the loading drum. By the use of such a long tape, it is possible to load a great number of articles upon the loading drum. A feeding electric motor is coupled to the feeding drum for turning same to move the tape relatively rapidly in the reverse, or feeding direction, to wind it upon the feeding drum and unwind it from the loading drum. During this time, the articles of linen are fed onto the input conveyor of the ironing machine.

One important feature of the invention resides in the provision of improved means for maintaining tension upon the tape during its movement to keep it taut. In said preferred embodiment, the electric circuits of the motor coils are such that while one of the motors is driving its associated drum, the other motor is acting as a generator of electricity, the necessary mechanical power being supplied to it by its associated drum. Said generator has an adjustable circuit load, so that the desired resistance is offered to the movement of the tape.

Another important feature of the invention resides in the provision of improved means for stopping the movement of the tape somewhat prior to the completion of its run in either direction, so that the tape will never be completely unwound from either drum. In said preferred embodiment, said tape has an enlargement near each end thereof which is adapted to close an associated switch mounted on the frame, whereby to shut off the power supplied to the motors.

Another important feature of the invention resides in the provision of improved means for controlling the speed of movement of the tape. In said preferred embodiment, the power for said motors is supplied by a pair of thyratrons, whose grids have an alternating current bias and a variable direct current positive bias. It is possible to vary the speed of the motors by varying the direct current bias. In order to vary the direct current bias, a differential gear mechanism is provided. One drive gear of the differential gear mechanism is coupled to the conveyor tape and has its speed determined by the speed of said tape. The other drive gear of the differential gear mechanism is driven during the loading operation by a motor whose speed may be operator-controlled. When the speed of the tape differs from that corresponding to the setting of this motor, the output shaft of the differential gear mechanism caries the setting of a potentiometer which controls the value of said direct current grid bias, so that the speed of the motor driving the tape is changed.

Said other drive gear of the differential gear mechanism is driven during the feeding operation by the input conveyor of the ironing machine to which articles of linen are being fed, the operation of the differential gear mechanism being analagous to its operation during the loading mechanism.

Another important feature of the invention resides in the provision of improved apron guide means for minimizing lateral shifting of the tape during the movement thereof, so as to ensure that it will be wound properly upon the drums. In said preferred embodiment, spaced, moveable, endless guide tapes are supported by the frame above the conveyor tape and in frictional engagement therewith. The support for said guide tapes is turnable about a vertical axis between two positions, so that the axis of movement of said guide tapes can be inclined in the direction of movement of the conveyor tape toward either side edge of said conveyor tape, depending upon the position of said support. A pair of solenoids are provided, said support being moved to either of its positions when a corresponding solenoid is energized. An apron guide switch is mounted on said frame opposite a side edge of said conveyor tape and also opposite a side of the apron guide assembly. While said conveyor tape is striking said switch so as to close same, the appropriate solenoid is energized so as to orient the guide tapes to a position in which they urge the conveyor tape away from the switch. While the switch is open, the other solenoid is energized, and the conveyor tape is urged toward the switch.

Another important feature of the invention resides in the fact that the guide tapes also act to spread and smooth out articles of linen carried on the conveyor tape and passing under the guide tapes in operative engagement therewith. The guide tapes are divided into two laterally spaced sets, and means are provided for orienting these sets of tapes so that they diverge in the direction of movement of the conveyor tape, whereby the smoothing action is accomplished.

Another important feature of the invention resides in the fact that it is possible to inspect the articles of linen while they are being loaded upon the conveyor tape, and to withdraw any of them which prove defective. In said preferred embodiment, the tape passes the inspection station in the loading operation just prior to passing under the guide tapes. Operator-actuatable means are provided for removing the conveyor tape from operative engagement with the guide tapes and for simultaneously stopping the motors, so that any defective article may be removed immediately after it passes the inspection station.

An important object of this invention is to provide improved circuit means so that the various operations of the machine, including those briefly summarized above, will be properly performed, regardless of the direction of movement of the tape, and so that the change-over between the feeding and loading operations may be made as nearly automatically as possible.

Other important objects of this invention are to provide a machine of the above-described type which may be easily moved between a feeding station and a loading station, which can be operated with electricity as its only source of power and which can be easily operated and serviced.

Other objects, advantages and features of this invention will become apparent from the following description, in conjunction with the annexed drawings, in which preferred embodiments are disclosed.

Figure 2:
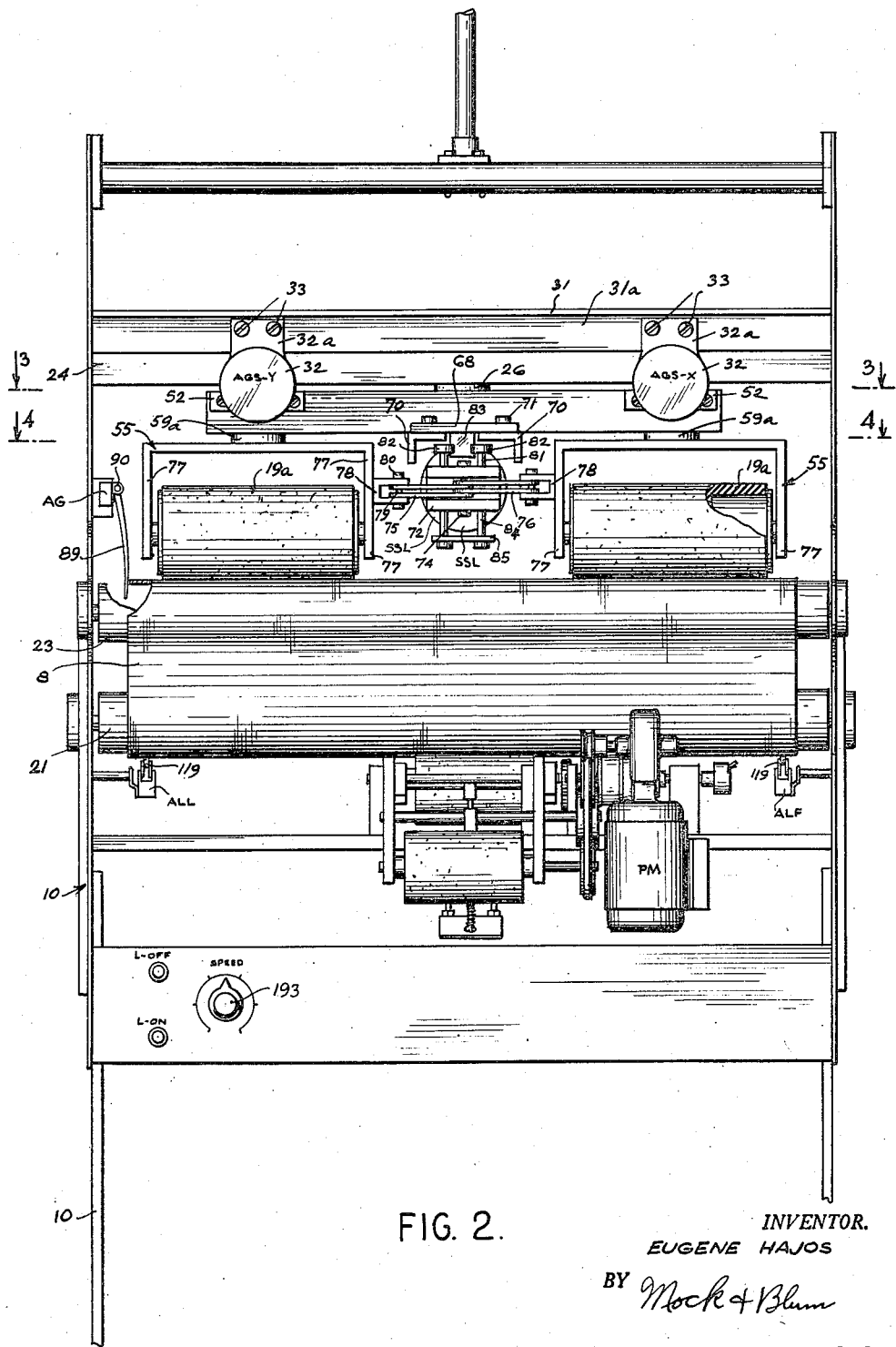
Fig. 2 is a front elevation of the machine, the lower part thereof being broken away.
Figure 3:
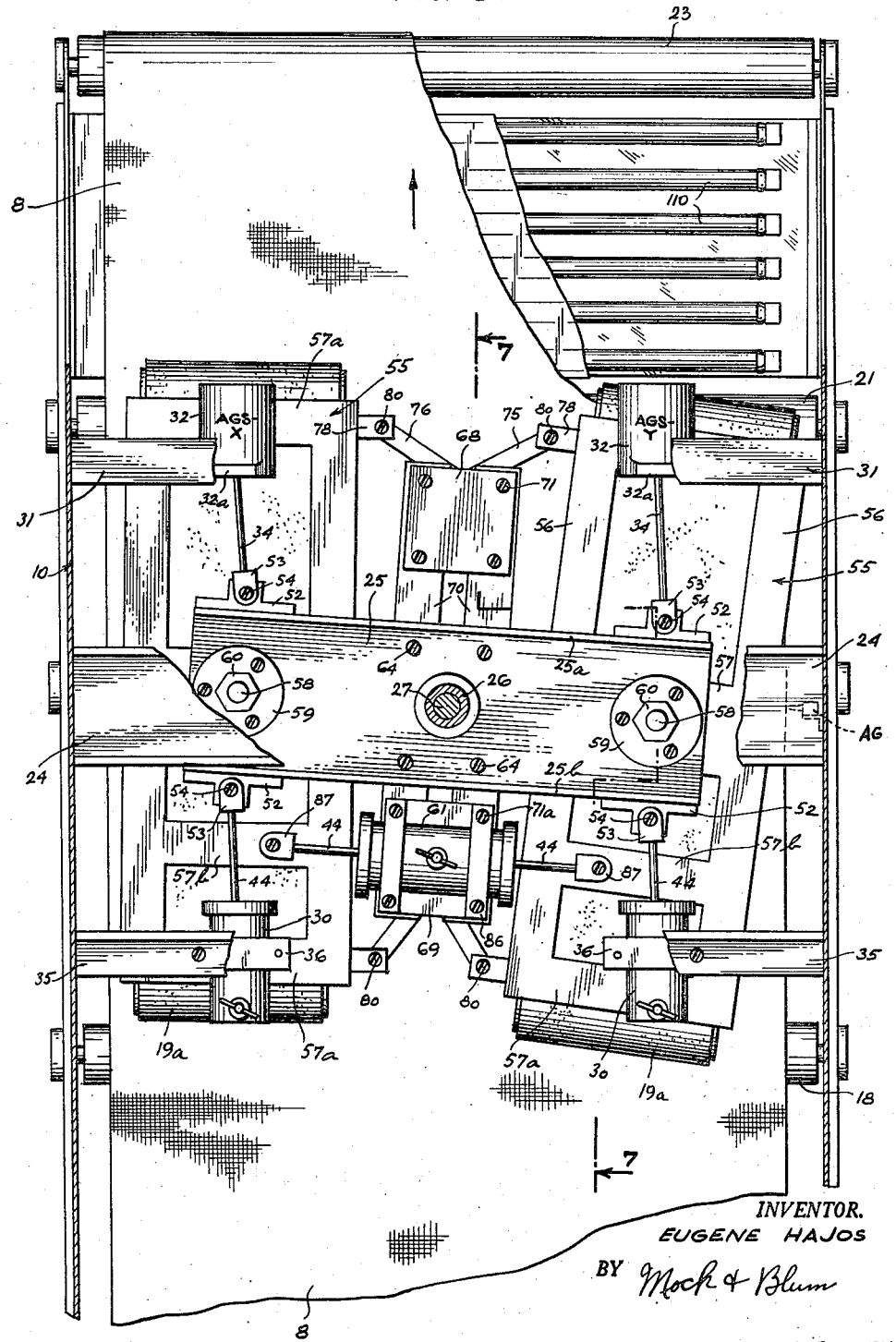

Fig. 3 is a section on line 3—3 of Fig. 2. In this view, the conveyor tape is moving in the feeding direction. This view shows the apron guide assembly in detail and shows the orientation of the guide tapes so as to smooth articles of linen. This view also shows the apron guide switch (shown in dotted lines) in its open position with the apron spaced therefrom, and shows the corresponding orientation of the guide tapes so as to shift the conveyor tape laterally toward said apron guide switch.

Figure 4:
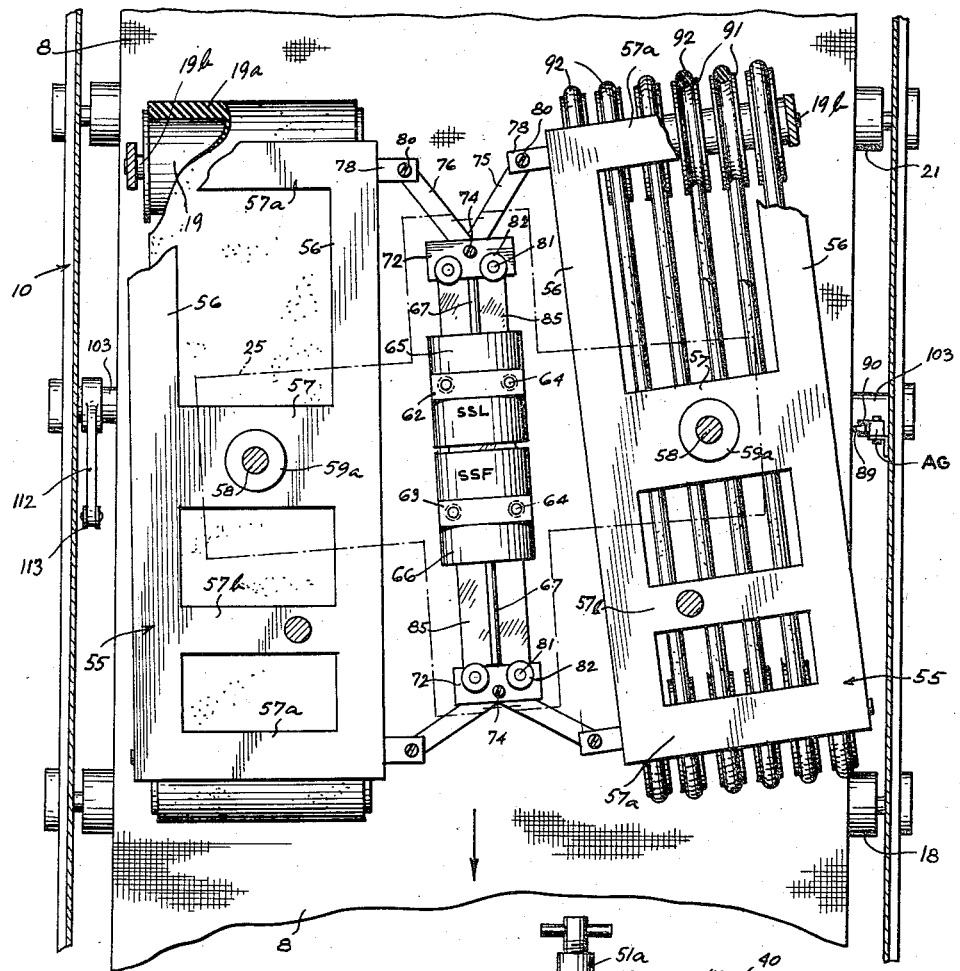

Fig. 4 is a section on line 4—4 of Fig. 2. In this view, the conveyor tape is moving in the loading direction, the guide tapes accordingly diverging in the opposite direction from that of Fig. 3. This view shows further details of the apron guide assembly and shows a modification thereof. In this view, the apron guide switch is closed, the positions of the parts being accordingly modified from their positions of Fig. 3.

Figure 5:
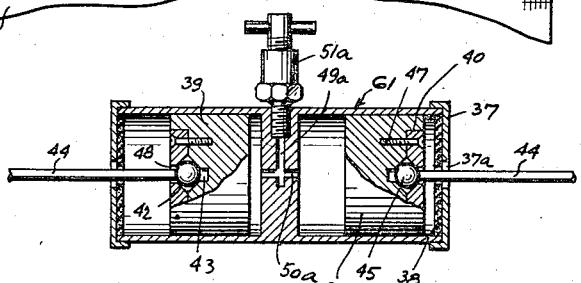

Fig. 5 is a vertical section of a double dash-pot which is part of the mechanism for determining the direction of divergence of the guide tapes.

Figure 6:
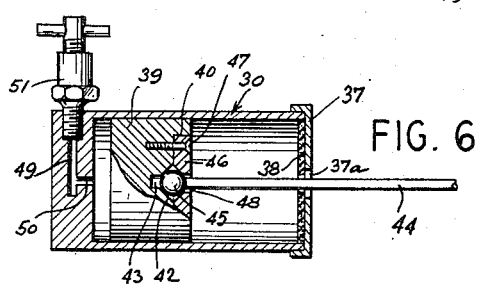

Fig. 6 is a vertical section of a single dash-pot which is part of the mechanism controlled by the apron guide switch.

Figure 7:
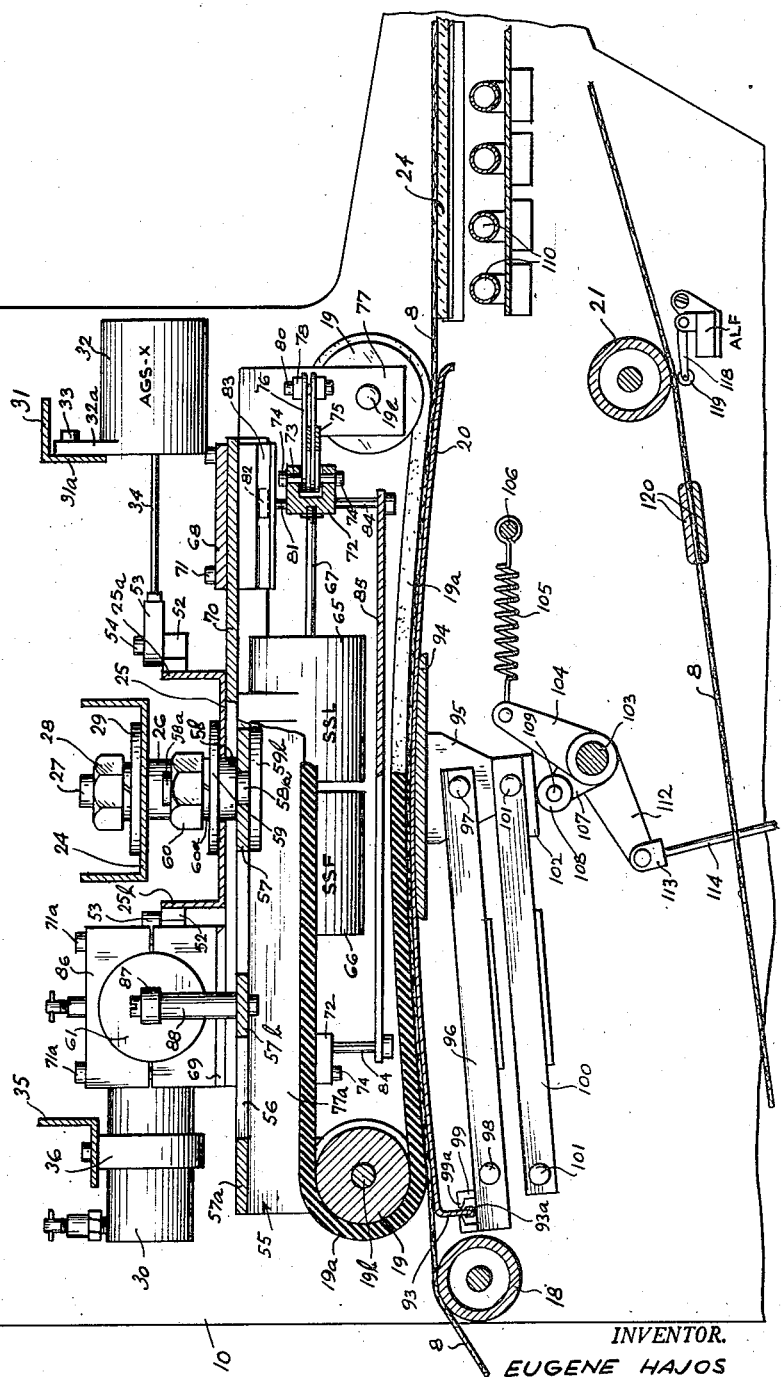

Fig. 7 is a section on line 7—7 of Fig. 3. This view shows further details of the guide tape assembly and also shows details of the means for stopping the movement of the conveyor tape at the end of the run and details of the mechanism for removing the conveyor tape from operative engagement with the guide tapes.

Figure 8:
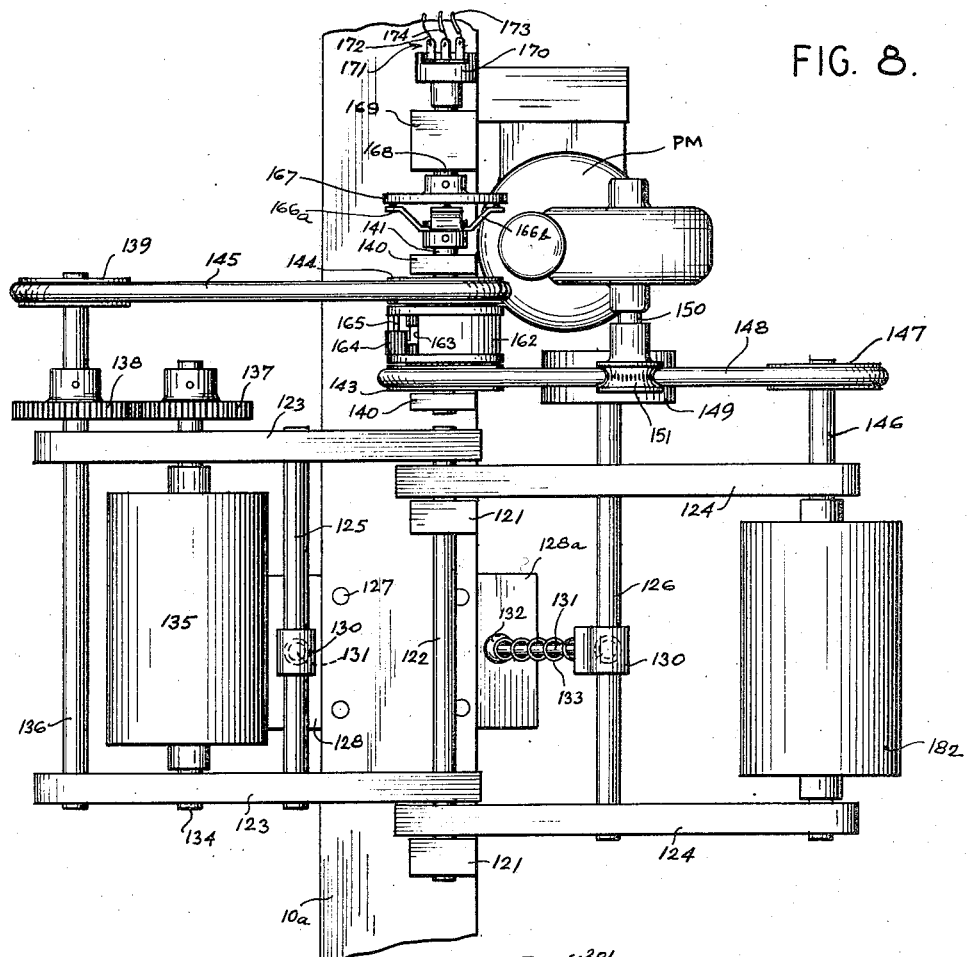

Fig. 8 is a top plan view of the conveyor speed control mechanism.

Figure 9:
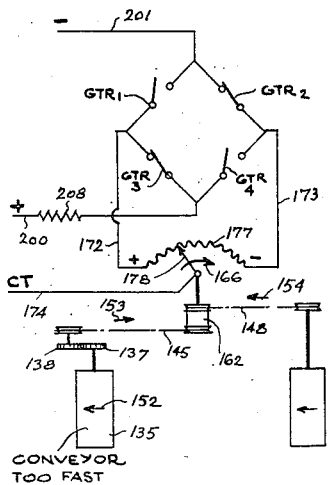

Fig. 9 is a schematic view of the conveyor speed control mechanism and also shows diagrammatically a portion of the electric circuit associated therewith. This view corresponds to the feeding operation and shows the relationships of the parts when the conveyor tape is moving too rapidly.

Figure 10:
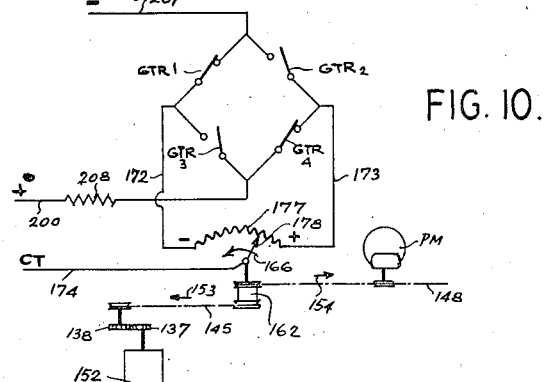

Fig. 10 is similar to Fig. 9, except that the conveyor is shown in its loading operation.

Fig. 11 is a detail top plan view of the differential gear mechanism which is a part of the speed control mechanism.

Fig. 12 is a section on line 12—12 of Fig. 11.

Fig. 13 is a side elevation of Fig. 8, showing the machine in its feeding operation.

Figure 14:
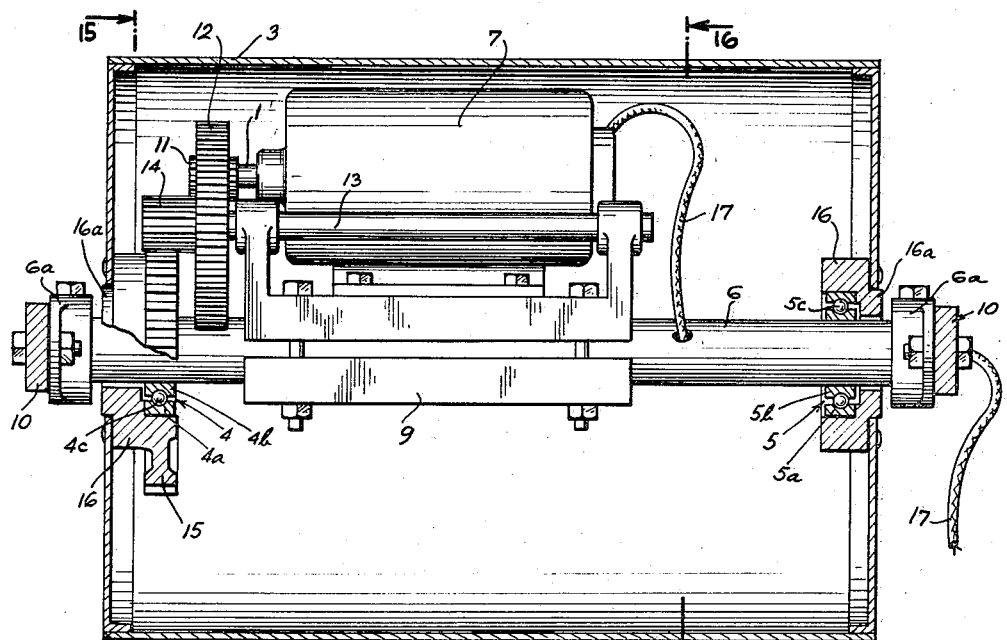

Fig. 14 is a vertical section, partly in elevation, of one of the conveyor drums, showing its associated electric motor mounted inside the drum.

Figure 15:
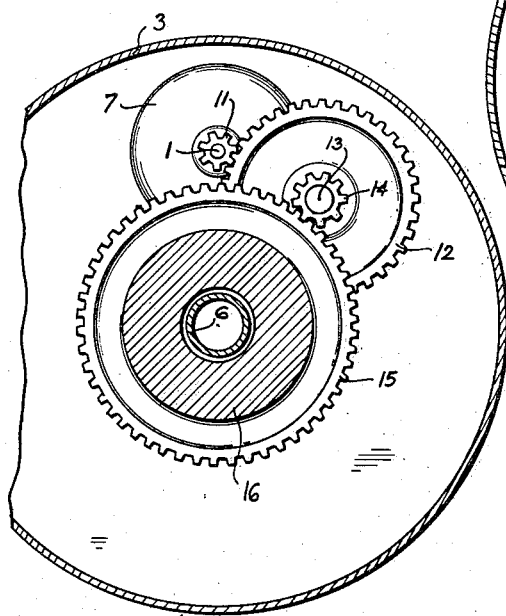

Fig. 15 is a section on line 15—15 of Fig. 14.

Figure 16:
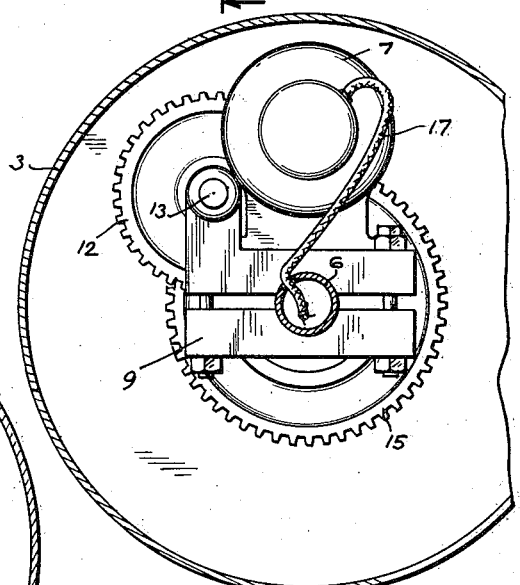

Fig. 16 is a section on line 16—16 of Fig. 14.

Figure 17A:
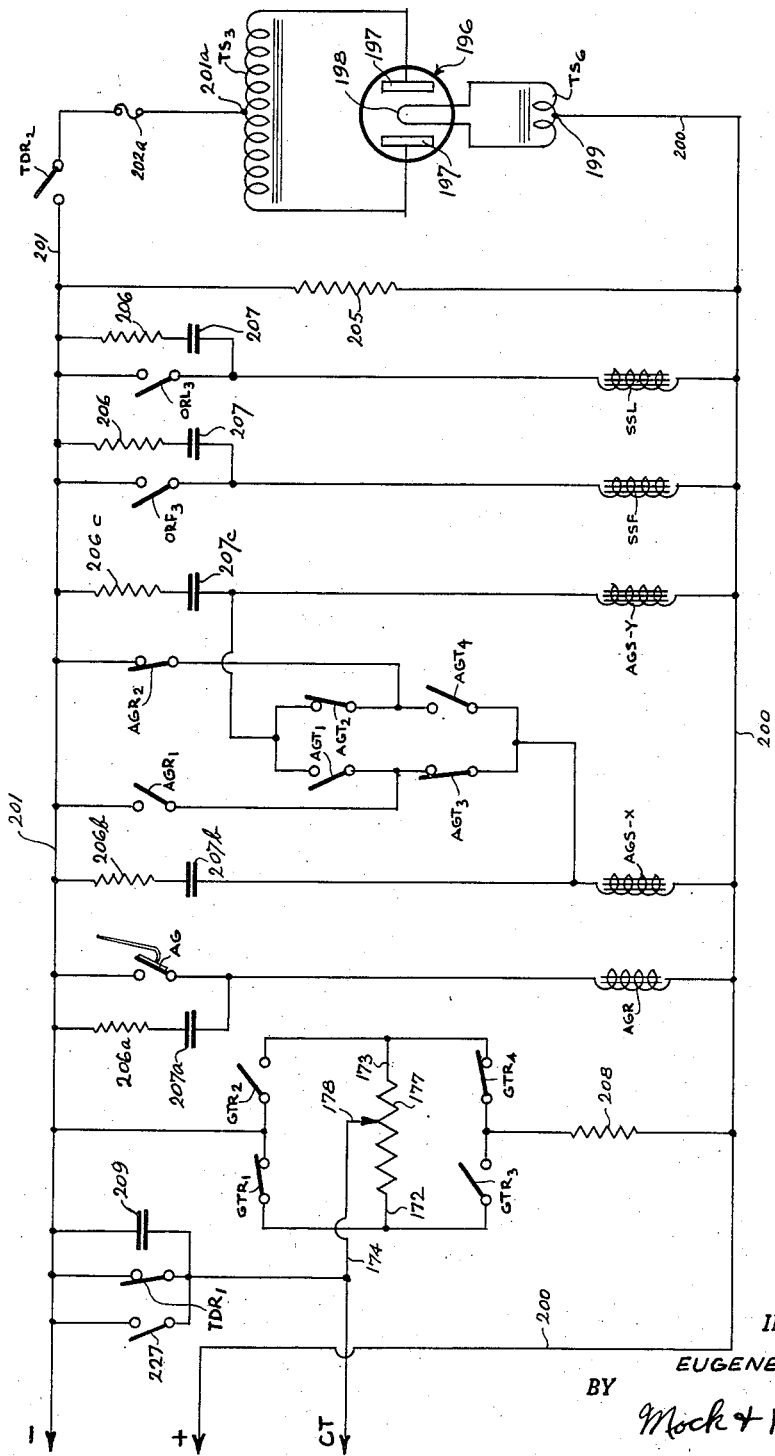
Figure 17B:
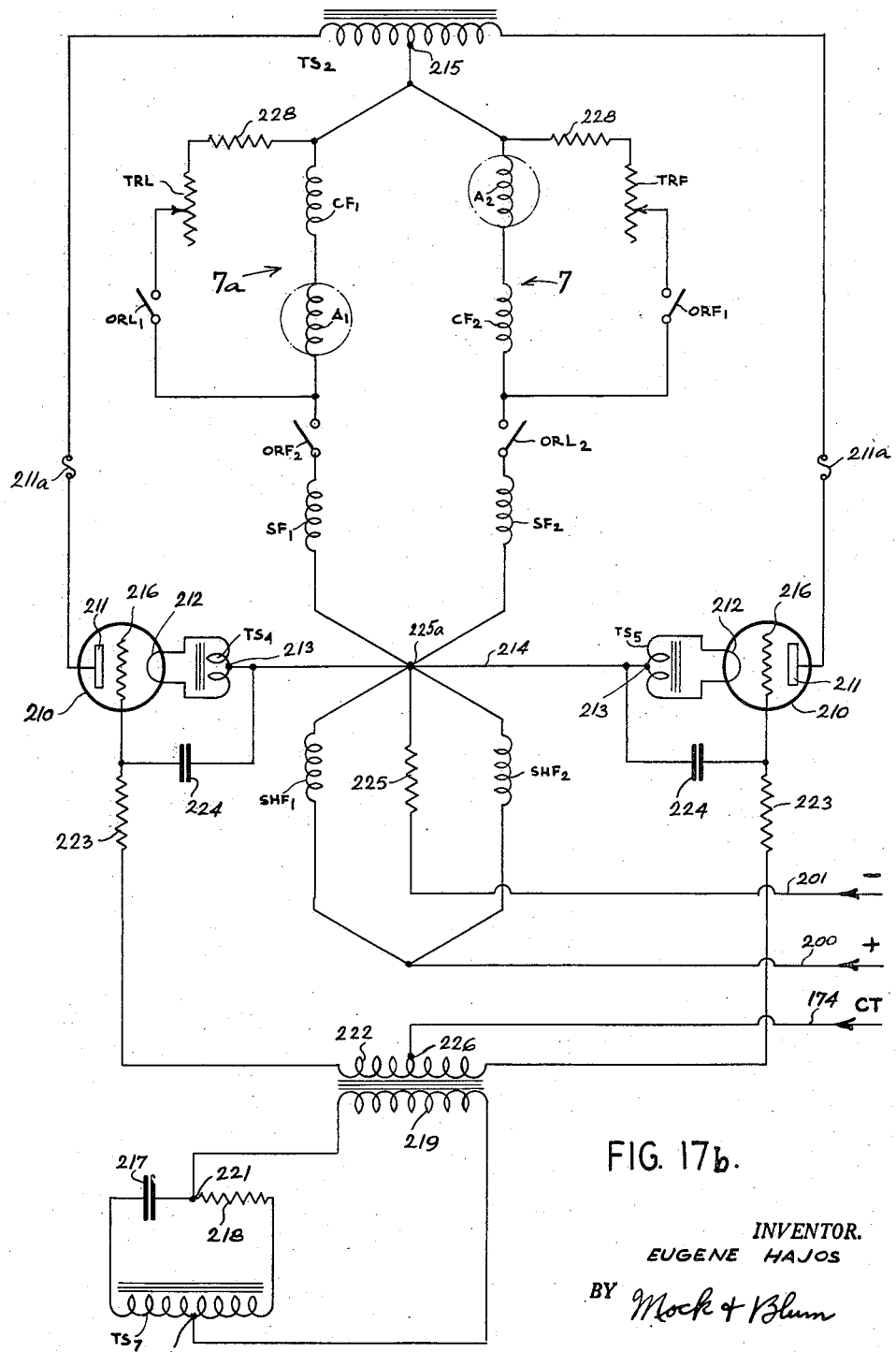

Figs. 17, 17a and 17b are a composite diagrammatic view of the electric circuit of the machine. Fig. 17 shows most of the switch-actuating relays of the circuit. Fig. 17a shows the means for current rectification and shows the operating solenoids of the machine. Fig. 17b shows the motor control circuit.

Figure 18:
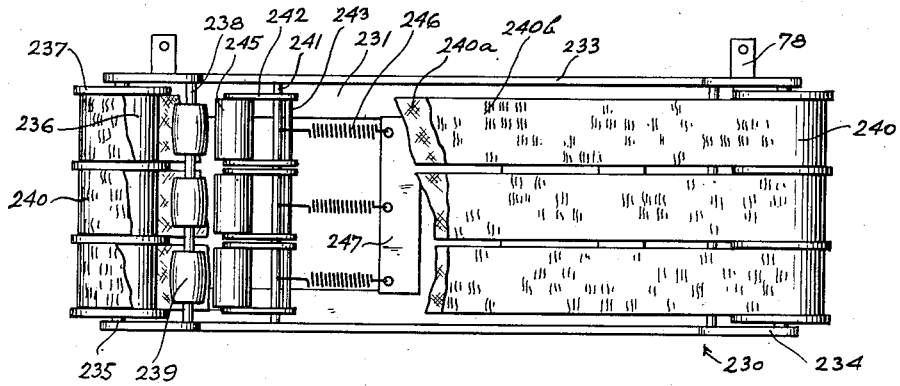

Fig. 18 is a bottom plan view, partly broken away, of a detail of an alternate embodiment of the apron guide assembly.

Figure 19:
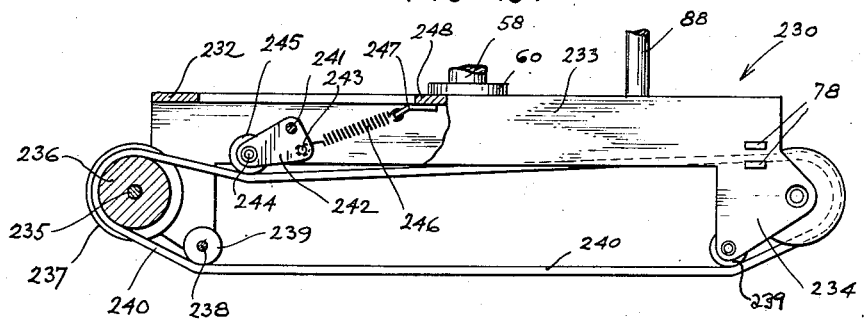

Fig. 19 is a side elevation, partly broken away, of the assembly shown in Fig. 18.

Fig. 20 is a side elevation of an alternate embodiment of the machine incorporating means for heating the conveyor tape when it is wound on the loading drum.

Fig. 21 is a section on line 21—21 of Fig. 20.

The drawings are substantially to scale of a working model of the invention.

Figure 1:
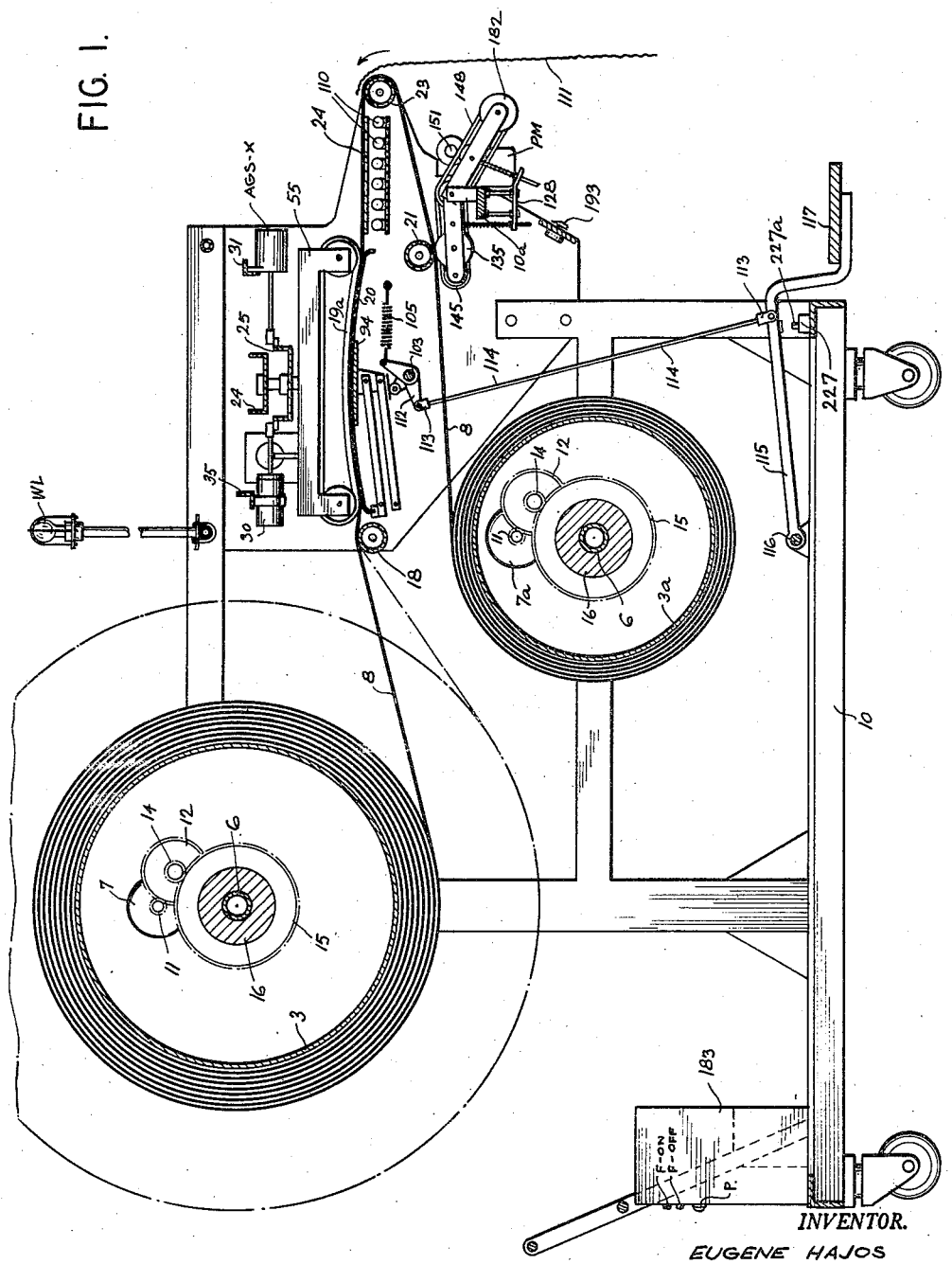
Fig. 1 is a vertical longitudinal section of the machine in its entirety.

Upon reference to the drawings in detail, it will be noted that most of the important features of the invention are generally shown in Fig. 1. A pair of hollow drums 3 and 3a are mounted on a longitudinally extending frame 10 so as to be turnable about their axes, which extend laterally. The loading drum 3 is located rearwardly of and above the feeding drum 3a. An electric loading motor 7 is located within loading drum 3 for driving same, and an electric feeding motor 7a is located within feeding drum 3a for driving same.

A conveyor tape, web or apron 8 is wound at one end portion thereof about drum 3a; leaves drum 3a at the top thereof; extends under a lateral roller 21 mounted on frame 10 and located forwardly of drum 3a; extends under, in front of and over a further lateral roller 23 mounted on frame 10 and located forwardly of and above roller 21; extends rearwardly of said roller 23 over the glass plate 24 of an inspection device and over a lateral roller 18 mounted on frame 10 and spaced rearwardly from plate 24; and is wound at the other end portion thereof about drum 3, said tape 8 entering upon drum 3 at the bottom thereof. When motor 7 is energized, tape 8 is moved in the loading direction of the arrow of Fig. 1 to wind the greater portion thereof upon drum 3, it being possible during this time to place articles of linen 111 successively on tape 8 and over roller 23 for loading upon drum 3. When motor 7a is energized, tape 8 is moved in the opposite, or feeding direction, to wind the greater portion thereof upon drum 3a, the articles 111 being discharged successively over the front of roller 23 and onto a conveyor belt 179 (Fig. 13), which carries the articles to an ironing machine (not shown).

Frame 10 is provided with suitable casters 2 or the like so that it can be moved to conveyor belt 179 for the feeding operation and can be moved away therefrom to any suitable loading station for the loading operation.

Tape 8 may be woven from glass thread and in my illustrated working model is about half a mile long and wide enough to receive standard towels and pillow cases.

For smooth operation, it is important that the movement of tape 8 in either direction be stopped before it reaches the limit of its travel and becomes completely unwound from a drum. Said tape 8 is provided with thickening pieces 120 located at the opposite sides thereof and near the respective ends thereof, whereby they close respective apron limit switches ALF and ALL when they strike the operating rollers 119 thereof during the respective feeding and loading movements of tape 8. Said switches ALF and ALL are mounted on the opposite sides of frame 10 with their rollers 119 bearing against tape 8 below roller 21. This is shown in Figs. 2 and 7.

When either switch ALF or ALL is closed, the operation of the machine is stopped.

For smooth operation, it is also important that means be provided for resisting the movement of tape 8 in either direction so as to maintain it under the proper tension. As will be explained below, either motor 7 or 7a acts as a generator while the other motor is energized, said generator being provided with a suitable adjustable load so that the motion of its associated drum is properly inhibited and proper tension upon tape 8 is maintained.

Means are provided for limiting lateral shifting of tape 8 during the movement thereof, so that it will be wound properly upon the drums. As is shown in Figs. 1 and 2 and in other views, tape 8 is operatively and frictionally engaged between a pair of laterally spaced, generally longitudinally extending, endless guide tapes 19a and a lower guide plate 20. Means are provided for changing the direction in which said tapes 19a extend, so as to urge tape 8 laterally toward or away from an apron guide switch AG mounted on frame 10 at one side of tape 8, the direction depending upon whether tape 8 operatively abuts the actuating arm 89 of said switch AG.

Means are provided for changing the orientation of said guide tapes 19a with respect to each other, depending upon the direction of travel of tape 8, so as to spread laterally any articles 111 carried by said tape 8.

Operator-actuable means including a foot lever 115 are provided for lowering guide plate 20 to relax the tension on tape 8 and permit withdrawal of articles from between tape 8 and tapes 19a if they have been indicated as defective when passing over glass inspection plate 24 in the loading direction. Said lowering means, when actuated, also opens a switch 227 mounted on frame 10, whereby to stop the loading motor 7.

Another major component of the machine is the speed control mechanism, which operates on the difference in speed between a pulley belt 145, which is coupled to tape 8 by means including a roller 135 which bears against tape 8 underneath roller 21, and a second pulley belt 148. In the loading operation, belt 148 is driven by motor PM, whose speed may be adjusted by the operator. In the feeding operation, pulley belt 148 is driven by ironer conveyor belt 179 (Fig. 13). The difference in speed between said belts 145 and 148 is utilized to control the motor speed, in a manner to be described in detail below.

The drums

Loading drum 3 and feeding drum 3a, which are substantially the same in construction, are shown in detail in Figs. 14–16. Drum 3 will be described in detail, it being understood that the description thereof applies almost identically to drum 3a.

Said drum 3 is in the form of a hollow cylinder and is turnably mounted on a hollow lateral shaft 6. The ends of said shaft 6 are fixedly supported by any suitable support members 6a, which are respectively mounted on the opposite sides of frame 10. Optionally, said support members 6a may permit lateral adjustment of shaft 6.

Drum 3 is mounted on shaft 6 by means of respective bearings 4 and 5. Said bearings 4 and 5 have the usual inner annular races 4b and 5b supported by shaft 6. The outer annular bearing races 4a and 5a are supported by respective mounting members 16 which support the respective end walls of drum 3. Balls 4c and 5c ride between the respective races 4a, 5a and 4b, 5b. Said mounting members 16 have lateral extensions 16a which extend into suitable openings in said end walls, said extensions 16a having respective bores through which the ends of shaft 6 protrude.

Motor 7 (motor 7a in the case of drum 3a) is fixedly mounted upon shaft 6 by means of a mounting support 9. Said motor 7 has a lateral driven shaft 1. Another lateral shaft 13 is turnably supported by support 9. Said shafts 1 and 13 protrude beyond the ends of support 9 and of motor 7 which are proximate to bearing 4. Shaft 1 carries gear 11. Shaft 13 carries gear 12, which meshes with gear 11. Shaft 13 also carries gear 14, which is located outwardly of gear 12. The support 16 which carries race 4a carries on its outer peripheral surface an integral gear 15, which meshes with gear 14. As a result, shaft 1 and drum 3 turn in unison. The speed ratio between shaft 1 and drum 3 is optionally 18:1.

When motor 7 is energized, in a manner to be described in detail below, shaft 1 is turned in a counterclockwise direction, as taken in Fig. 15, whereby to drive drum 3 in the same direction and move tape 8 in the loading direction. When tape 8 is driven by motor 7a in the feeding direction, shaft 1 turns in the opposite direction, the circuit of motor 7 then being such that it acts as a generator of electric current. As will also be explained in detail below, a suitable load is applied to motor 7 so as to exert a braking effect on shaft 1 and hence on drum 3, so that the proper tension upon tape 8 is maintained. A similar description applies to motor 7a.

The circuit wires of motor 7 are contained externally thereof in cable 17, which extends through an opening in the wall of shaft 6 and hence out of one end thereof.

Apron guide mechanism

This is shown in detail in Figs. 2–7.

This mechanism and the spreading mechanism are together supported above tape 8 by means of a lateral, horizontal bar 24 which is fixed to frame 10. A vertical sleeve 26 extends through an opening in bar 24 and is supported above bar 24 by an integral flange 29. Shaft 27 extends through said sleeve 26 and is supported above sleeve 26 by nut 28. Channel iron 25 is turnably mounted on shaft 27 below sleeve 26, the details of mounting being omitted.

Channel iron 25 is spaced from bar 24, is horizontal and extends generally laterally. Channel iron 25 has respective upstanding front and rear flange 25a and 25b.

A pair of vertical sleeves 58 extend through suitable openings in channel iron 25 on opposite sides of shaft 27. As is shown in Fig. 7, each sleeve 58 is fixed to iron 25 by integral flange 59 above said iron 25. Shaft 58a extends through sleeve 58 and is supported above sleeve 58 by nut 60. The central cross-arm 57 of a frame 55 is turnably mounted upon shaft 58a below sleeve 58 by means of mounting member 59b, which contains suitable bearings (not shown).

Each said frame 55 comprises horizontal longitudinal arms 56, between which extend said cross-arm 57, front and rear cross-arms 57a and an intermediate cross-arm 57b located rearwardly of said arm 57. At the front and rear of frame 55, said longitudinal arms 56 carry at their outer side edges depending legs 77. Shafts 19b are respectively turnably mounted between the front and rear pairs of legs 77 and respectively carry front and rear rollers 19. An endless belt or tape 19a extends around said rollers 19. Longitudinal bars 77a may connect respective longitudinally alined pairs of legs 77.

Modifications of frame 55 are possible, one of the frames 55 in Fig. 4 being accordingly shown in an alternate construction. In this modification, a plurality of laterally spaced pulleys 91 are mounted on each of the shafts 19b. An endless tape 92, which may be circular in cross-section, extends around each pair of alined front and rear pulleys 91. Each frame 55 may support the tapes 92, or each frame 55 may support the tapes 19a.

As will be explained in detail below, tape 8 is supported from below so that it frictionally abuts the pair of tapes 19a below said rollers 19. This is clearly shown in Fig. 7. A pair of apron guide solenoids AGS–X and AGS–Y control the turned position of iron 25 on shaft 27 and thereby control the orientation of tapes 19a with respect to tape 8 in such a way that they guide tape 8 laterally. A further pair of spreader solenoids SSF and SSL control the turned positions of frames 55 on the respective shafts 58 in such a way that tapes 19a spread articles carried by tape 8. These solenoids SSF and SSL will be further discussed under the heading "Spreader mechanism."

In order to support said solenoids AGS–X and AGS–Y, a horizontal bar 31 extends across frame 10, forwardly of channel irons 24 and 25. Bar 31 has a depending flange 31a at its rear edge. The respective casings 32 of the solenoids AGS–X and AGS–Y have upstanding flanges 32a which are connected to the front face of flange 31a by means 33, whereby said solenoids AGS–X and AGS–Y are laterally spaced with their axes extending longitudinally and horizontally. These solenoids are conventional in construction, and each has a piston rod 34 extending rearwardly out of casing 32 and longitudinally movable.

Another horizontal bar 35 extends across frame 10 rearwardly of channel irons 24 and 25. A pair of dashpots 30 are mounted on the lower face of bar 35 by means 36. Said dashpots 30 are laterally spaced with their axes extending longitudinally and horizontally.

Fig. 6 shows a detail of a dashpot 30. Said dashpot 30 has a hollow cylindrical cavity which is open at its front end. Said opening is closed by cap 37 which has a central opening 37a. A flexible annular gasket 38 of felt may be mounted on the inner face of cap 37 to keep dust out of the cavity. Piston 39 is slidably positioned within the cavity of dashpot 30. Said piston 39 has a cylindrical recess 40 in its front face, which is co-extensive and co-axial with a recess 42 of rearwardly decreasing diameter, is in turn co-extensive and co-axial with a rearwardly extending cylindrical recess 43. Piston rod 44 has attached to its rear end a ball 45 which is seated against the peripheral face of recess 42.

Ball 45 is retained in its seat by cylindrical plate 46, which fits within recess 40 and which is secured to piston 39 by screws 47. Said plate 46 has a central through-and-through opening 48, which is cylindrical in its front portion and which gradually increases in diameter at its rear portion to complete the seat for ball 45. Piston rod 44 extends through recess 48 and also through the openings of gasket 38 and cap 31. The latter opening 37a is sufficiently large so that ball 45 can turn in its seat, and so that rod 44 can move laterally and transversely within said opening 37a.

At the rear of dashpot 30, there is a radial opening 49 which communicates with a recess 50 which in turn communicates with the rear of the cavity of said dashpot 30. The flow of air into and out of opening 49 is controlled by valve 51, which is adjustably mounted in said opening 49.

The solenoid piston rods 34 are coupled to the front flange 25a of channel iron 25, and the dashpot piston rods 44 are coupled to the rear flange 25b of channel iron 25. In each instance, a mounting member 52 is attached to the outer face of the respective flange, and a coupling member 53 is mounted upon said member 52 by vertical pivot pin 54. The respective rod 34 or 44 is fixed to said coupling member 53.

As will be described in detail below, either solenoid AGS–X or AGS–Y may be energized, to draw its associated piston rod 34 forwardly and pivot arm 25, the dashpots 30 serving to damp the pivoting movement.

The determination of which solenoid, AGS–X or AGS–Y, is energized depends upon whether apron guide switch AG is open or closed. As stated above, switch AG is mounted on frame 10 adjacent one side of tape 8, this being the left side as taken in Fig. 2. Switch AG is preferably located on a lateral line of intersection of the axis of shaft 27.

The purpose of locating switch AG in this manner is to minimize "hunting" of the longitudinal guide mechanism. When the frame supporting tapes 19a is turned about the axis of shaft 27, the tapes 19a act to turn the tape 8 about the axis of shaft 27. As a result, the points on the side edge of tape 8 adjacent switch AG move laterally. However, the lateral movement of the points on the side edge of tape 8 is at a minimum for the point which is located on the lateral line of intersection of the axis of shaft 27.

If switch AG were located a substantial distance forwardly or rearwardly of the lateral line of the intersection of shaft 27, the action of tapes 19a upon tape 8, after opening of switch AG, would cause rapid turning of the point on the side edge of tape 8 opposite switch AG, so as to close switch AG almost immediately, thereby resulting in a "hunting" action. It is preferable that the correction in the lateral position of tape 8 be accomplished gradually.

Switch AG includes a switch lever 89, which depends downwardly from its support 90, to which said lever 89 is attached in such a way as to be turnable about a longitudinal axis. Lever 89 extends below the level of tape 8 at the point of support of lever 89. Lever 89 is biased by spring means (not shown) to a normal selected inward position of the portion of lever 89 in the plane of tape 8, in which position switch AG is open. When tape 8 travels in such a way as to strike lever 89 and move it in a clockwise direction (as taken in Fig. 2) from its normal position, switch AG is closed.

As will be described in detail below, when tape 8 is moving in the feeding direction, and when switch AG is open, solenoid AGS–X is energized, while solenoid AGS–Y is energized when switch AG is closed. When solenoid AGS–X is energized, as shown in Fig. 3, tapes 19a are oriented so as to tend to shift tape 8 toward lever 89. When tape 8 strikes lever 89, so that solenoid AGS–Y is energized, tapes 19a are oriented so as to urge tape 8 away from lever 89.

It will be apparent that the orientations of tapes 19a must be reversed when tape 8 is moving in the loading direction. In fact, as will also be described in detail below, when tape 8 is moving in the loading direction, solenoid AGS–Y is energized when switch AG is open, and solenoid AGS–X is energized when switch AG is closed.

*Spreader mechanism*

This is also shown in detail in Figs. 2–7.

The spreader solenoids SSL and SSF, previously referred to, are supported by a pair of flat, laterally spaced, longitudinally extending bars 70, which are fixed to the lower face of bar 25 by means of screws 64. Said bars 70 are laterally located on opposite sides of shaft 27.

Square plates 68 and 69 are attached to the respective front and rear ends of bars 70, on the upper faces thereof, by means of respective sets of screws 71 and 71a. Said bars 70 have suspended therefrom, by means of respective mounting members 62 and 63 which are attached to bars 70 by means of said screws 64, the front casing 65 of solenoid SSL and the rear casing 66 of solenoid SSF. Said casing 65 and 66 extend in longitudinal alinement.

Solenoids SSL and SSF are conventional in construction, and respectively have piston rods 67 extending out of the front of casing 65 and out of the rear of casing 66. These piston rods 67 are pivotally coupled to the frames 55.

Upon consideration of the front piston rod 67, as clearly shown in Figs. 2 and 7, it will be seen that the front end of piston rod 67 is mounted within the rear connecting portion of a generally laterally extending U-shaped block 72, the arms of the U extending longitudinally and being transversely spaced. A vertical pivot pin 73 extends through suitable recesses in the longitudinal arms of said block 72 and is secured thereto by upper and lower nuts 74. Two pairs of arms 75 and 76 are turnably mounted on pivot pin 73, said arms being interleaved as shown in Figs. 2 and 7 in order to maintain transverse spacing between the arms of each set. Said arms 75 and said arms 76 respectively extend forwardly of pin 73 and toward opposite sides of the machine.

As is best shown in Fig. 2, said arms 75 and 76 are respectively pivotally coupled to the respective inner front legs 77 of said frames 55. Each said inner front leg 77 carries a U-shaped mounting bracket 78 whose arms extend laterally and are transversely spaced. The respective arms 75 and 76 are respectively turnably mounted on suitable vertical pivot pins 79 which are supported by the arms of said brackets 78. The pins 79 are held in place by upper and lower nuts 80.

The upper face of block 72 carries a pair of laterally spaced, upstanding pins 81, the upper ends of which respectively carry turnable bearing rollers 82. A guide 83 depends from front plate 68, between bars 70, said guide 83 having longitudinal channels in the sides thereof, in which said rollers 82 are respectively received, each said roller 82 being held turnably against the inner face of its channel.

The rear piston rod 67 is coupled to the rear portions of frame 55 in the same manner. To strengthen the assembly, each said block 72 carries depending, laterally spaced pins 84, and a longitudinal bar 85 extends below casings 66 and 65 and is mounted at its respective ends upon the respective front and rear pins 84. At one end, the bar 85 has respective holes through which the pins 84 extend. At the other end, bar 85 has longitudinally elongated slots 85a through which pins 84 extend, said pins 84 being longitudinally slidable within said slots 85a to allow for variations in the spacing of the front and rear pins 84 during longitudinal movement thereof.

As will be explained below, either solenoid SSL or SSF may be energized, whereby the two piston rods 67 are drawn rearwardly or forwardly, depending upon which solenoid is energized. In Fig. 3, solenoid SSF has been energized, this corresponding to the movement of tape 8 onto drum 3a in the direction of the arrow of Fig. 3. As a result of the energizing of solenoid SSF, piston rods 67 are drawn forwardly. Because of the above-described manner in which rods 67 are coupled to the frames 55, the front ends of frames 55 are thereby spread apart and the rear ends thereof drawn toward each other, so that frames 55 diverge from rear to front. Therefore, the tapes 19a tend to spread laterally and smooth out articles of linen placed on tape 8 and moving in the feeding direction.

Fig. 4 shows the positions of the parts corresponding to the energizing of solenoid SSL, with tapes 19a now diverging from front to rear so that they spread articles of linen moving in the loading direction of the arrow of Fig. 4.

A double dashpot 61, for damping the action of solenoids SSF and SSL is clearly shown in Figs. 3 and 7 and in the detail view of Fig. 5. Upon comparison of Figs. 5 and 6, it will be seen that each dashpot portion of double dashpot 61 is substantially the same as dashpot 30. The axes of the dashpot portions of double dashpot 61 are alined, and said portions have a common wall corresponding to the rear wall of dashpot 30. Said dashpot portions share a common air passage 49a, 50a and valve 51a corresponding to the correspondingly numbered parts 49, 50 and 51 of dashpot 30.

Said dashpot 61 is mounted upon plate 69 by means of screws 71a and longitudinal clamps 86, as shown in Fig. 3. The dashpot piston rods 44 extend laterally. Each rod 44 is pivotally mounted by bracket 87 upon an upstanding pin 88 which is fixed to cross-arm 57b of frame 55.

*Inspection and release mechanism*

This is clearly shown in Figs. 1 and 7. As stated above, tape 8 is supported below tapes 19a by tension plate 20.

Tension plate 20 extends longtiudinally and is slightly convex upwardly. Plate 20 has a depending lateral flange 93 at its rear end. The support means for tension plate 20 includes a flat support plate 94 located under the central portion of plate 20. Said plate 94 carries a depending and longitudinally extending plate 95. An upper bar 96 is connected adjacent its front end to plate 95 by means of a lateral pivot 97. Bar 96 is mounted near its rear end upon frame 10 by means of a further lateral pivot 98. Rearwardly of pivot 98, bar 96 carries a pair of laterally extending, longitudinally spaced and alined, upstanding legs 99. The upper ends 99a of these legs 99 are turned toward each other. Flange 93 extends freely movably between leg ends 99a and is enlarged at its lower end 93a to prevent its withdrawal.

A lower bar 100 is connected at its front and rear ends, by means of lateral pivots 101, to plate 95 and frame 10 respectively. Said bar 100 carries a bearing plate 102 on its lower face below its front pivot 101. Bars 96 and 100 are substantially parallel, so that plate 94 tends to move in substantially a straight vertical path. As a result, plate 94 is maintained substantially horizontal during any movement thereof. This makes it possible to maintain uniform tension of plate 20 against tapes 19a, even if they become slightly stretched.

Lateral shaft 103 is turnably mounted on frame 10 below the arms 96 and 100. An arm 104 is fixed to shaft 103 and extends forwardly and upwardly therefrom. The upper end of arm 104 is coupled to frame 10 by spring 105 and pin 106, the action of spring 105 tending to turn shaft 103 in a clockwise direction, as taken in Fig. 7.

Shaft 103 carries a further arm 107 which extends upwardly and rearwardly therefrom. Roller 108 is turnably mounted on a lateral pin 109 fixed to arm 107.

Roller 108 abuts the lower face of plate 102. As a result, tension plate 20 is normally forced upwardly. The end portions of plate 20 hold tape 8 against tapes 19a below the rollers 19. The central portion of plate 20 forces tapes 8 and 19a into an upwardly convex position. Any articles of linen carried by tape 8 are held in frictional abutment with tapes 19a.

As previously stated, an inspection device including horizontal glass plate 24 is located forwardly of the front rollers 19. Said plate 24 is suitably supported by frame 10, and a plurality of fluorescent lamps 110 are located below plate 24 and are also suitably supported by frame 10. In the loading movement of tape 8, as shown in Fig. 1, the operator places a laundered but unironed article of linen 111 against tape 8 and over roller 23. As the article 111 passes over glass plate 24, the operator inspects it for holes, discoloration or other flaws (tape 8 being translucent). If a flaw is detected, article 111 will usually have already been tensioned against tapes 19a by tension plate 20. Means are provided for then lowering plate 20 momentarily in order to permit withdrawal of article 111.

Said lowering means includes an additional arm 112 fixed to shaft 103 and extending rearwardly and downwardly therefrom. As is shown in Fig. 1, arm 112 is pivotally coupled by bracket 113 to the upper end of linking rod 114, the lower end of which is pivotally coupled by another bracket 113 to an intermediate portion of lever 115. The rear end of lever 115 is attached by lateral pivot 116 to frame 10. The front end of lever 115 carries a foot pedal 117.

When pedal 117 is depressed, roller 108 is lowered. The central portion of tension plate 20 drops by gravity, permitting withdrawal of article 111. The rear portion of plate 20 does not drop, because the rear portion of arm 96 bears against flange 93. This makes it certain that the front portion of plate 20 will move away from tapes 19a. Upon release of padel 117, tension plate 20 returns to its normal position.

Normally closed switch 227 is mounted on frame 10 below lever 115. When pedal 117 is depressed, lever 115 strikes and depresses the upwardly extending button 227a of said switch 227, thereby opening switch 227. As will be explained below, this results in the stopping of motor 7 and hence of tape 8. Upon release of pedal 117, motor 7 again operates.

Stop mechanism

This is clearly shown in Figs. 2 and 7.

The apron limit switches ALL and ALF are mounted by any suitable means on the respective sides of frame 10, under roller 21. Switch ALF will first be described, it being understood that the construction and operation of switch ALL is substantially identical therewith, except as pointed out below.

Switch ALF includes a closure lever 118 which is mounted thereon for movement about a lateral axis. This lever 118 carries a roller 119 at its free end. Lever 118 is spring-biased (by means not shown) so that roller 119 normally abuts tape 8 below roller 21. Switch ALF is normally open.

Tape 8 carries a pair of relatively thick pads 120 on its upper and lower faces at the side edge portion thereof proximate to switch ALF, said pads 120 being located near the trailing end edge of tape 8 in its feeding run. Before tape 8 is completely unwound from drum 3 during the feeding operation, the pad portions 120 pass between rollers 21 and 119 and turn lever 118 in a counterclockwise direction, as taken in Fig. 7. This closes switch ALF. When switch ALF is thus closed during the feeding operation, the movement of tape 8 ceases almost immediately. In the meantime, however, the pad portions 120 will have moved slightly past rollers 119 and 21, toward drum 3a, as shown in Fig. 7.

Switch ALF cannot be active during the loading movement of tape 8, because in that case the movement would be stopped almost as soon as it had started. Instead, switch ALL is active during the loading operation, tape 8 accordingly having another pair of upper and lower pad portions 120 at the side portion thereof proximate to switch ALL and located near the trailing edge of tape 8 in its loading run. Of course, switch ALL is only active during the loading operation.

Speed control mechanism

This mechanism is shown in detail in Figs. 8–13.

As previously stated, the general purpose of this mechanism is to regulate the speed of travel of tape 8 to the speed of an operator loading articles of linen 111 thereon when it is moving in its loading direction, and to regulate the speed of travel of tape 8 to the speed of travel of a belt 179 upon which said articles 111 are fed while said tape 8 is moving in its feeding direction.

The construction and operation of the speed control mechanism will be described first with reference to movement of tape 8 in its loading direction.

The mechanism is mounted upon a horizontal, lateral arm 10a of frame 10. Arm 10a carries a pair of laterally spaced uprights 121. A lateral shaft 122 is fixedly supported by said uprights 121. A first pair of laterally spaced frame arms 123 are turnably mounted on said shaft 122 and extend longitudinally rearwardly thereof. A second pair of laterally spaced frame arms 124 are also turnably mounted on said shaft 122 and extend longitudinally forwardly thereof. Said arms 123 are fixed intermediate their ends to a lateral shaft 125, and said arms 123 are fixed intermediate their ends to a lateral shaft 126.

Means are provided for adjustably supporting the shafts 125 and 126, whereby to support the frame arms 123 and 124. Arm 10a carries a plurality of depending pins 127, the lower ends of which are threaded. These pins 127 extend through suitable openings in a horizontal, longitudinally extending plate 128. The vertical position of plate 128 may be set adjustably by means of nuts 129 screwed onto each pin 127 above and below plate 129. Plate 128 has a downwardly inclined extension 128a at its front end.

Blocks 130 are respectively turnably mounted on shafts 125 and 126. Rods 131 respectively depend from blocks 130 and extend through respective holes in plate 128 and plate extension 128a. Said rods 131 are respectively approximately transverse to said plate 128 and said plate extension 128a. Each rod 131 extends slidably through a ball 132, said balls 132 being respectively turnably seated upon the upper faces of plate 128 and plate extension 128a. A spring 133 is coiled around each rod 131 with its lower end abutting ball 132. The upper ends of springs 133 respectively abut the blocks 130 and urge arms 124 in a counterclockwise direction and arms 123 in a clockwise direction, as taken in Fig. 13, about the axis of shaft 122. Arms 123 extend approximately horizontally. Arms 124 are inclined downwardly from rear to front.

Lateral shaft 134 is turnably mounted on arms 123 rearwardly of shaft 125 and carries roller 135 fixed thereto. Roller 135 is located below and proximate to roller 21 and between rollers 119. Tape 8 travels between rollers 21 and 135 and is frictionally held therebetween, as the result of the force exerted on arms 123 by the respective spring 133. The movement of tape 8 in its loading direction causes movement of roller 135 in a clockwise direction, as taken in Fig. 13.

Another lateral shaft 136 is turnably mounted on arms 123 rearwardly of shaft 134. Said shafts 134 and 136 extend outwardly of the right-hand arm 123, as taken in Fig. 2, and respectively carry meshing gears 137 and 138. These gears 137 and 138 bear a 1:1 ratio to each other. Shaft 136 also carries a pulley 139 outwardly of gear 138.

Frame arm 10a carries a pair of laterally spaced uprights 140, which support a differential gear mechanism to be described in detail below. At this point, it will merely be stated that uprights 140 turnably support a shaft 141, said shaft 141 turnably carrying collars 142 between said uprights 140, and said collars 142 respectively having pulleys 143 and 144 turnably mounted thereon. The outer pulley 144 is longitudinally alined with pulley 139, and these pulleys carry pulley belt 145.

Lateral shaft 146 is turnably mounted on arms 124 at the front thereof. Said shaft 146 carries a pulley 147 which is longitudinally alined with inner pulley 143. Pulleys 143 and 147 carry pulley belt 148. Shaft 126 has an extension which carries a pulley-like idler roller 149, said roller 149 being alined with pulleys 143 and 147, so that belt 148 engages the top and bottom thereof, as shown in Fig. 13. The diameter of roller 149 is sufficiently great to maintain belt 148 under tension.

Frame 10 carries a motor PM which has a laterally inwardly extending driven shaft 150. Shaft 150 carries a drive pulley 151 located above roller 149 in position to engage pulley belt 148. Said belt 148 is frictionally held between pulley 151 and roller 149, as the result of the action of spring 133 upon frame arms 124. Motor PM drives shaft 150 in such a direction that pulley 151 turns belt 148 in the opposite direction from that of belt 145. As a result, pulleys 143 and 144 turn in opposite directions.

Fig. 10 is a schematic top plan view, in which arrow 152 represents the loading direction of movement of tape 8 at the point at which it engages roller 135, and arrows 153 and 154 respectively represent the directions of movement of the respective upper portions of belt 145 and belt 148. As will be explained below, motor PM may be manually regulated by the operator to control the speed of belt 148. The difference in speed between belts 145 and 148 is then converted by the differential gear mechanism and associated parts into a signal which is automatically utilized to adjust the speed of tape 8 and thereby reduce the speed differential of belts 145 and 148 to zero.

The differential gear mechanism will now be described. This is best shown in Figs. 11 and 12. Shaft 141 extends through openings in the uprights 140 and is turnably supported therein by respective bearing assemblies 155. The collars 142 are located next to the respective inner faces of the uprights 140. Said pulleys 143 and 144 respectively have through-and-through lateral bores 156, each said bore 156 having an outer portion 157 of increased diameter. Said collars 142 are respectively received within said bore portions 157. A sleeve 158 surrounding shaft 141 is positioned between collars 142 and is turnably located within the main bores 156.

Said pulleys 143 and 144 respectively have integral coaxial gears 159 of reduced diameter on their proximate faces, said bores 156 being common to the respective associated pulleys and gears. Said gears 159 are laterally spaced from each other.

A cylindrical collar 160 is mounted on sleeve 158 between gears 159. Collar 160, sleeve 158 and shaft 141 are connected together by pin 161. Collar 160 carries on its peripheral surface an integral, substantially annular support member 162, which is thicker than collar 160 and whose inner diameter is greater than that of gears 159. Said support member 162 has a recess 163 extending inwardly from its peripheral surface.

A pair of gears 164 are respectively fixed to lateral shafts 165 which are respectively turnably mounted in the respective side walls of recess 163. Each gear 164 meshes with a respective gear 159, so that gears 164 turn in opposite directions. Gears 164 travel at speeds which vary depending upon the difference in speed of pulley belts 145 and 148.

In addition to meshing with gears 159, gears 164 mesh with each other. Any difference in speed of gears 159 and 164 causes a compensating turning of support member 162 and hence of shaft 141. In Fig. 10, it is illustratively assumed that conveyor tape 8 is moving too rapidly, so that the gear 164 associated with pulley 144 turns more rapidly than the other gear 164, the resulting motion of shaft 141 being shown by arrow 166. Arrow 166 would be reversed if tape 8 were moving too slowly.

As is shown in Fig. 8, the outer end of said turnable shaft 141 has mounted thereon the spring elements 166b of a slip clutch. The disc member 167 of said clutch is mounted on the inner end of a shaft 168 which extends through a mounting block 169 located upon frame arm 10a. Said shaft 168 is alined with shaft 141. Extrusions 166a carried by said spring elements 166b are maintained thereby in contact with the inner face of disc 167, so that motion of shaft 141 is transmitted to shaft 168.

The outer end of shaft 168 carries the wiper arm 178 of a rotary potentiometer 170 carried by frame arm 10a. Said potentiometer 170 has an internal resistance coil 177 which has the usual two connections (not shown) to two external posts 171 mounted on housing 170.

The external potentiometer leads 172 and 173 are connected to respective posts 171, and a third lead 174 is connected to another post 171 which is connected to arm 178.

When wiper arm 178 reaches the limit of its travel in either direction with respect to resistance coil 177, extrusions 166a slip on the face of disc 167, so that further motion of shaft 141 in that direction is not transmitted to shaft 168.

As will be described in detail below, current is supplied from a positive line 200 and resistance 208 and from a negative line 201, through a network of switches $GTR_1$, $GTR_2$, $GTR_3$, and $GTR_4$ to said leads 172 and 173, and hence to the respective ends of said resistance coil 177. In the loading operation, as shown in Fig. 10, switches $GTR_4$ and $GTR_1$ are closed; and positive lead 200 is connected through resistance 208 and through switch $GTR_4$ to lead 173, and negative lead 201 is connected through switch $GTR_1$ to lead 172. The potential difference between leads 174 and 201 is applied to the motor control circuit to be described below.

As illustrated in Fig. 10, when the speed of motor PM is reduced by the operator, so that tape 8 is moving too rapidly, arm 178 is moved in the direction of arrow 166 so as to make the potential difference between leads 174 and 201 less positive, this change in potential being applied to the motor control circuit in such a way as to reduce the speed of motor 7 until arm 178 stops moving and reaches a new equilibrium position. A similar result occurs if tape 8 moves too slowly, except that arrow 166 is reversed, and the speed of motor 7 is now increased.

Fig. 9 corresponds to the feeding movement of tape 8, arrows 154 and 153 being accordingly reversed from Fig. 10. Switches $GTR_3$ and $GTR_2$ are now the closed switches; and lead 200 is connected through resistance 208 and switch $GTR_3$ to lead 172, and lead 201 is connected through switch $GTR_2$ to lead 173. Accordingly, the polarity of coil 177 is reversed from that of Fig. 10.

In the feeding operation, articles of linen 111 travel upon tape 8 from left to right, as taken in Fig. 13 (the upper segment of tape 8 being considered), over roller 23 and onto conveyor belt 179. Said belt 179 is carried by roller 180, which moves in the direction of arrow 181. Shaft 146 has a roller 182 fixed thereon between frame arms 124. Prior to the feeding operation, frame 10 is moved forwardly on casters 2, so that roller 182 rides under roller 180 and is forced downwardly thereby, against the action of spring 133. This is clearly shown in Fig. 13.

As a result, pulley belt 148 is lowered out of engagement with pulley 151, and roller 182 is frictionally driven by tape 179 and roller 180. Pulley belt 148 turns in the opposite direction from its direction of turning during the loading operation and arrows 154 and 153 are reversed in Fig. 9 from their directions of Fig. 10.

In Fig. 9, it is illustratively assumed that tape 179 slows down, so that conveyor tape 8 is moving too rapidly. It will be apparent that arrow 166 is reversed with respect to Fig. 10. Therefore, just as in the loading operation, the potential between leads 201 and 174 becomes less positive. In this case, the speed of motor 7a decreases. The operation when tape 8 moves too slowly is obvious.

*Electric control circuit—loading*

This is shown in the composite view of Figs. 17, 17a and 17b. Fig. 17b shows the motor circuit, and attention will first be directed to the control circuit portion of Figs. 17 and 17a.

The electrical control elements of the machine are mainly located in a housing 183 mounted on frame 10 at the rear of the machine. Plug P extends out of the rear of housing 183 and is adapted to be plugged into a power socket L during the loading operation and a power socket F during the feeding operation. For convenience, the control circuit will first be described assuming that plug P is plugged into socket L.

Plug P has prongs $P_1 \ldots P_8$ which are respectively engaged in corresponding receptacles $L_1 \ldots L_8$ of socket L. One line 184 of an alternating current source (not shown) is connected to receptacle $L_2$ and hence to prong $P_2$. The other line 185 of said alternating current source is connected to receptacles $L_1$, $L_4$, $L_5$ and $L_7$ and hence to prongs $P_1$, $P_4$, $P_5$ and $P_7$. Prong $P_8$ and receptacle $L_8$ are grounded and serve as a ground for frame 10.

In viewing the drawings, it will be noted that all switches are shown in their normal positions, whether open or closed. In general, each set of switch contacts is indicated by reference letters corresponding to the reference letters indicating the solenoid or relay controlling the operation of said switch, the switches also bearing distinguishing numerical subscripts.

Upon reference to Fig. 17, it will be noted that line 184 is connected through receptacle $L_2$, prong $P_2$ and fuse 186 to line 176. Line 185 is connected through receptacle $L_1$, prong $P_1$ and fuse 188 to line 189. Pilot light PL, which is mounted on the rear of housing 183, is connected between lines 187 and 189 and is lighted showing that plug P is connected into socket L.

Transformer primary TP is connected across lines 187 and 189 and is thereby supplied with power. In turn, transformer primary TP supplies power to a plurality of transformer secondaries designated as TS and further designated by identifying numerical subscripts. These transformers secondaries are shown in Figs. 17b and 17a.

Line 185 is connected through receptacle $L_4$, prong $P_4$, button switch L–ON and loading relay ORL to line 187 and hence to line 184. Said switch L–ON is located at the front of frame 10 and is normally open. When switch L–ON is manually closed, relay ORL is energized.

Switch L–ON opens as soon as it is released. However, in the meantime, the normally open switch $ORL_4$ has been closed, so that one side of switch L–ON is connected through prong $P_4$, receptacle $L_4$, line 185, receptacle $L_5$, prong $P_5$, normally closed button switch L–OFF (also located at the front of frame 10), normally closed button switch F–OFF (located at the rear of housing 183), normally closed switch $ALR_1$ and said switch $ORL_4$ to the other side of switch L–ON. Switch L–ON is thus shorted, so that relay ORL remains energized. However, the loading operation may be stopped at any time by pressing switch L–OFF so as to open same, thereby de-energizing relay ORL and causing switch $ORL_4$ to open. The manner in which the loading operation is controlled by relay ORL will be explained below.

When relay ORL is energized, switch $ORL_5$ is closed. Said switch $ORL_5$, normally closed switch $ALR_5$ and white lamp WL are connected in series between lines 189 and 187. Therefore, lamp WL shines steadily while relay $ORL_5$ is energized. Lamp WL is located at the top of frame 10.

Line 189 is connected through switch $ORL_6$, which is closed when relay ORL is energized, and the primary coil 228 of voltage regulator 229 to line 187. Said voltage regulator 229 is of a standard type such that the voltage across secondary coil 230 remains 110 volts even though the voltage across primary coil 228 may vary within predetermined limits.

One end of secondary coil 230 is connected to line 187, and the other end of coil 230 is connected to the movable arm 180 of rheostat 191. One end of rheostat 191 is connected to one end of field coil 192 of motor PM, motor PM being in turn connected to line 187. Therefore, motor PM operates when relay ORL is energized. Said arm 190 is coupled to dial 193 on the front of frame 10, said dial 193 being turnable with respect to the scale marked "Speed" so as to vary the speed of motor PM, thereby indirectly varying the speed of travel of tape 8, as described above.

Line 189 is also connected through switch $ORL_6$ to one terminal 231 of the circuit 232 for inspection lamps 110, the other circuit terminal 233 being connected to line 187. A plurality of lamps 110 may be connected in parallel.

It will be convenient at this point to discuss the operation of apron limit relay ALR, as this will virtually complete reference to Fig. 17 during the discussion of the loading operation.

Line 185 is connected by receptacle $L_7$, prong $P_7$, normally open apron limit switch ALL and relay ALR to line 187 and hence to line 184. When switch ALL is closed by a pair of thickened tape portions 120, in the manner previously described, relay ALR is energized. Swith $ALR_2$ is thereby closed. Said switch $ALR_2$ and relay ALR are connected in series between lines 189 and 187. Therefore, relay ALR remains energized despite the fact that the tape portions 120 pass beyond switch ALL before the movement of tape 8 ceases.

Switch $ALR_1$, which has been described above, is opened when relay ALR is energized, so that relay ORL is de-energized in the same manner as if button L–OFF had been pushed, thereby stopping the loading operation.

Switch $ALR_3$, which is closed when relay ALR is energized, is connected in series with single stroke bell SSB between lines 189 and 187. Said bell SSB rings once when relay ALR is energized.

Switch $ALR_2$ and flasher FL are connected in series between lines 189 and 187. Therefore, when relay ALR is energized, cam member 193 of said flasher FL is caused to rotate. This causes intermittent movement of the usual flasher arm 194 into and out of engagement with contact element 195.

Lamp WL is connected in series between flasher arm 194 and line 187. Switch $ALR_4$, which is closed when relay ALR is energized, is connected in series between contact element 195 and line 189. Switch $ALR_5$, which normally shorts out arm 194 and element 195, is open when relay ALR is energized. Therefore, lamp WL flashes intermittently while relay ALR is energized.

Upon reference to Fig. 17a, it will be noted that it shows a conventional double diode 196 for producing full-wave rectification of alternating current. Transformer secondary $TS_3$ is connected between the rectifier plates 197, and the ends of the common cathode 198 are connected to the respective ends of transformer secondary $TS_6$. Said transformer secondary $TS_6$, which serves as the heater for said cathode 198, is connected at center tap 199 to line 200. Said transformer secondary $TS_3$ is connected at center tap 201a by fuse 202a and switch $TDR_2$, in series, to line 201. Said switch $TDR_2$ is normally open. Rectifier load resistance 205 is connected between lines 201 and 200.

In the conventional manner, when switch $TDR_2$ is closed, a direct current voltage is produced across resistance 205, line 200 being positive, as indicated by the symbol +, and line 201 being negative, as indicated by the symbol –.

Time delay relay TDR is shown in Fig. 17. Line 189 is connected to a contact element 202 and to one end of a resistance element 203 of a conventional time delay tube DT. The other end of resistance element 203 is connected to line 187. Tube DT has a conventional bimetal strip 204, and relay TDR is connected between said strip 204 and line 187. After plug P is plugged into socket L, there is a time delay while the heat generated by element 203 heats strip 204 until it bends sufficiently to touch element 202. When this occurs, current flows through element 203 and relay TDR in parallel. The current through element 203 remains sufficient to produce enough heat to maintain strip 204 in its bent position. Sufficient current flows through relay TDR to energize it. Switch $TDR_2$ is thereby closed, so that the output circuit of rectifier 196 is put into operation after a suitable time delay.

In further reference to Fig. 17a, it will be assumed that switch TDR₂ is closed.

Switch ORL₃ and loading spreader solenoid SSL are connected in series between lines 200 and 201. Resistance 206 and condenser 207 are connected in series across switch ORL₃ to reduce sparking. When relay ORL is energized, switch ORL₃ is closed and solenoid SSL is energized. As previously described, tapes 19a are thereby moved to their positions of Fig. 4 so as to spread articles of linen moving thereunder in the loading direction.

Apron guide relay AGR and apron guide switch AG are connected in series between lines 200 and 201. Resistance 206a and condenser 207a are connected across switch AG. When switch AG is closed, in the manner previously described, relay AGR is energized.

Apron guide solenoid AGS–X, closed switch AGT₃ and normally open switch AGR₁ are connected in series between lines 200 and 201. Resistance 206b and condenser 207b are connected in series across switches AGR₁ and AGT₃. Apron guide solenoid AGS–Y, closed switch AGT₂ and normally closed switch AGR₂ are connected in series between lines 200 and 201. Resistance 206c and condenser 207c are connected in series across switches AGT₂ and AGR₂.

It will be apparent that when switch AG is open, solenoid AGS–Y is energized, whereby tapes 19a are oriented in the manner previously described so as to guide tape 8 toward switch AG. When switch AG is closed, and relay AGR is energized, switch AGR₁ is closed and switch AGR₂ is opened. Solenoid AGS–X is now energized, whereby tapes 19a are oriented in the manner previously described so as to guide tape 8 away from switch AG.

The potentiometer 177 and associated switches GTR₁ . . . GTR₄ have been previously discussed. The positions of these switches during the loading operation are shown in Fig. 17a, it being noted that grid transfer relay GTR is only energized during the feeding operation. It need merely be added that normally closed time delay relay switch TDR₁ is connected between line 201 and line 174, so as to short out the output signal of potentiometer coil 177 until time delay relay TDR is energized and switch TDR₁ is opened. Condenser 209 is connected across switch TDR₁.

In addition, normally open switch 227 is connected between lines 201 and 174. When switch 227 is closed by the depressing of foot pedal 117, the output signal of resistance coil 177 is shorted out.

*Electric control circuit—Feeding*

This circuit is similar to the loading circuit, and only the differences will be discussed.

During the feeding operation, prongs P₁ . . . P₈ are engaged in corresponding receptacles F₁ . . . F₈ of socket F. Power lines 184a and 185a respectively replace lines 184 and 185 and are connected through respective receptacles F₂ and F₁ to the respective prongs P₂ and P₁.

Line 185a is connected through receptacle F₃, prong P₃, button switch F–ON and feeding relay ORF to line 187 and hence to line 184a. Switch F–ON and relay ORF are similar to switch L–ON and relay ORL. Switch ORF₄ connects switches ALR₁ and F–ON; and prong P₅ is connected through receptacle F₅ and trouble relay switch TR to line 185a, so that the on-off operation during feeding is analogous to that during loading. Switch TR is controlled by a subsequent machine (not shown) to which articles of linen are fed and may be opened when trouble occurs in said subsequent machine, so as to stop the feeding operation.

Switch ORF₅ is connected in parallel with switch ORL₅, and the upper end of switch ALF is connected through prong P₆ and receptacle F₆ to line 185a, so that the operation of lamp WL is the same as during loading.

Motor PM does not run during feeding.

Apron guide transfer relay AGT is connected in parallel with relay ORF and is energized during the feeding operation. As a result, switches AGT₁ and AGT₄ are closed, and switches AGT₂ and AGT₃ are opened. Switch AGR₁, switch AGT₁ and solenoid AGS–Y are connected in series between lines 201 and 200, so that solenoid AGS–Y is energized when switch AG is closed. Switch AGR₂, switch AGT₄ and solenoid AGS–X are connected in series between lines 201 and 200, so that solenoid AGS–X is energized when switch AG is open. The effect of this upon the operation of the machine has been previously discussed.

Switch ORF₃ and solenoid SSF are connected in series between lines 201 and 200, so that solenoid SSF, instead of solenoid SSL, is energized during feeding. The effect of this upon the operation of the machine has been previously discussed.

Grid transfer relay GTR is connected in parallel with relay ORF and is energized during the feeding operation. As a result, switches GTR₁ and GTR₄ are opened, and switches GTR₂ and GTR₃ are closed. The effect of this upon the operation of the machine has been previously discussed.

*Motor and braking circuit*

This is shown in Fig. 17b.

Loading motor 7 and feeding motor 7a are direct current, compound-wound motors. Motor 7 has an armature coil A₂, commutator field coil CF₂, series field coil SF₂ and shunt field coil SHF₂. Similarly, motor 7a has an armature coil A₁, commutator field coil CF₁, series field coil SF₁ and shunt field coil SHF₁.

Said shunt field coils SHF₁ and SHF₂ are connected in parallel with each other; and one of their junctions is connected to line 200, and their other junction 225a is connected through resistance 225 to line 201. As a result, each motor 7 and 7a has a constant shunt field when relay ORL or ORF is energized.

The remaining coils of motors 7 and 7a are given a variable excitation by means of a pair of thyratrons 210 which are connected in push-pull relationship. The plates 211 of said thyratrons 210 are connected through respective fuses 211a to the opposite ends of plate transformer secondary TS₂, which provides the plate power. The cathodes 212 of said thyratrons 210 are respectively connected across respective heater transformer secondaries TS₄ and TS₅. Said transformer secondaries TS₄ and TS₅ are respectively center-tapped at 213, and said taps 213 are joined by line 214. Line 214 is also connected to junction 225a.

During the loading operation, switches ORL₁ and ORL₂ are closed as a result of the energizing of relay ORL. Switches ORF₁ and ORF₂ are open. Coil SF₂, switch ORL₂, coil CF₂ and coil A₂ of loading motor 7 are connected in series, as is conventional, between line 214 and the center tap 215 of transformer secondary TS₂. Series field coil SF₁ of feeding motor 7a is out of circuit, and the output of thyratrons 210 is applied only to the loading motor coils A₂, CF₂ and SF₂.

The thyratron grids 216 are respectively connected through respective current limiting resistances 223 to the opposite ends of grid transformer secondary 222. The center tap 226 of said transformer secondary 222 is connected through line 174, arm 178 and potentiometer coil 177 to line 201, and hence through resistance 225 to the cathodes 212. It will be apparent that a fixed negative direct current bias is applied to grids 216, as a result of the connection of cathodes 212 to tap 225a, which is positive relative to line 201 and hence positive relative to grids 216. Also, a variable positive direct current bias is applied to grids 216, as a result of the connection of grids 216 to potentiometer arm 178, which is ordinarily positive relative to arm 201 and hence ordinarily positive relative to cathodes 212.

In order to obtain alternating current bias upon grids 216, phase shifting condenser 217 and resistance 218 are connected in series with transformer secondary $TS_7$. Grid transformer primary 219 is connected across the junction 221 between condenser 217 and resistance 218 and the center tap 220 of transformer secondary $TS_7$.

Optionally, the input voltages of transformer secondaries $TS_7$ and $TS_2$ are in phase; and the voltage across transformer primary 219 leads the voltage across transformer secondary $TS_7$ by 90°, and the voltage across transformer secondary 222 lags behind the voltage across primary 219 by 180°. Optionally, therefore, the alternating current grid bias of the thyratrons 210 lags behind their alternating current anode voltage by 90°.

In one working example, the combined resistances of coils $SHF_1$ and $SHF_2$ is 600 ohms. The value of resistance 225 is 75 ohms. The value of resistance 208 is 50,000 ohms. The value of resistance 177 is 20,000 ohms. The voltage difference between lines 200 and 201 is approximately 250 volts. Therefore, cathode 212, which is connected to the junction between the shunt field coils and resistance 225, is positive with respect to line 201, the voltage difference between cathode 212 and line 201 being approximately 22 volts. Therefore, a fixed negative bias of approximately 28 volts is applied to grid 216.

As a result of the adjustable connection of grid 216 to a point on potentiometer resistance 177, a variable positive bias is applied to grid 216. If grid 216 is connected to resistance 177 at the negative end thereof, the positive bias is zero, and the resultant direct current bias upon grid 216 is approximately —28 volts. If grid 216 is connected to resistance 177 at the positive end thereof, the positive bias is approximately 71 volts, and the resultant direct current bias upon grid 216 is approximately +43 volts. Therefore, by varying the position of potentiometer tap 178, it is possible to vary the thyratron direct current grid bias between —28 volts and +43 volts.

Optionally, bypass condenser 224 is connected between each grid 216 and line 214.

In the working example, the maximum amplitude of the alternating grid bias is approximately 10 volts. At the start of a positive pulse of anode voltage of one of the thyratrons 210, the grid thereof has a bias consisting of the direct current bias less 10 volts. If the resultant grid bias is negative, the tube does not fire. During the positive pulse of anode voltage, the grid bias can increase approximately 20 volts (as the alternating current bias swings positive). If at any time during the positive pulse of anode voltage, the grid bias swings to zero (or almost zero) the tube fires and draws current for the remainder of said positive pulse. A similar action occurs during the succeeding positive pulse of anode voltage of the other tube 210.

As a result, a pulsating direct current of twice the frequency of the line voltage passes through windings $A_2$, $CF_2$ and $SF_2$. The duration of each pulse depends upon the value of the direct current grid bias, and hence depends upon the potential difference between lines 174 and 201. When this potential difference is increased, the duration of the current pulses through windings $A_2$, $CF_2$ and $SF_2$ increases, and the speed of motor 7 increases.

Similarly, when this potential difference is decreased, the speed of motor 7 decreases.

It will be apparent that when either time delay switch $TDR_1$ or switch 227 is closed, there is no positive direct current bias applied to grids 216. As a result, the grid bias of tubes 210 is always negative, so that motor 7 is not driven. As a further precaution, during the initial time delay period, the shunt field coils $SHF_1$ and $SHF_2$ are not energized while switch $TDR_2$ remains open. Condenser 209 serves as a protective condenser across lines 174 and 201, with switch $TDR_1$ serving to discharge condenser 209 when plug P is disconnected from its socket.

Potentiometer arm 178 is adjustable with respect to potentiometer coil 177 between a position substantially corresponding to the closing of switch 227 and a position in which sufficient direct current bias is applied to grids 216 to maintain them always positive, in which latter position the current output pulses of tubes 210 occupy almost the entire time cycle.

As stated above, motor 7a acts as a brake during the loading operation. While series field coil $SF_1$ is out of circuit, shunt field coil $SHF_1$ is energized. Commutator field coil $CF_1$, armature coil $A_1$, closed switch $ORL_1$, adjustable tension resistance potentiometer TRL and resistance 228 are all connected in series. The action of tape 8 in being unwound from drum 3a causes said drum 3a to turn, whereby armature $A_1$ of motor 7a turns with respect to the shunt field winding $SHF_1$ thereof. As a result, motor 7a acts as a generator of electric current in armature coil $A_1$, with resistances TRL and 228 serving as the load. The current in coil $A_1$ causes a counter electromotive force, the extent of which depends upon the value of resistances TRL and 228, tending to resist the turning of the armature and thereby maintaining tension upon tape 8. Clearly, the tension upon tape 8 may be adjusted by adjusting resistance TRL.

During the feeding operation, switches $ORF_1$ and $ORF_2$ are closed, and switches $ORL_1$ and $ORL_2$ are open. Coil $CF_1$, coil $A_1$, closed switch $ORF_2$ and coil $SF_1$ are now connected in series between transformer tap 215 and line 214. Coil $SF_2$ is out of circuit. As a result, motor 7a is now the driving motor, and motor 7 acts as the braking or tensioning means for tape 8. The operation of the motors is entirely analogous to their operation during the loading operation.

*Apron guide assembly—Alternate embodiment*

Previously, reference has been made to the endless guide tapes 19a supported by frames 55 above conveyor tape 8, said tapes 19a being positioned to spread articles of linen carried by tape 8 and to orient the direction of travel of said tape 8. Reference has also been made to a modification, shown in Fig. 4, in which the tapes 19a are replaced by a plurality of belts 92.

Reference is now made to Figs. 18 and 19, which show a modification in which the frames 230 are provided with improved means for supporting guide tapes.

Frame 230 is generally similar to frame 55 and is supported and oriented in an identical manner. Frame 230 has horizontal longitudinal arms 231, between which extend front and rear cross arms 232, as well as the necessary intermediate cross arms. Said frame 230 has vertical, longitudinal arms 233 depending from the outer side edges of said arms 231. At the front and rear of frame 230, said arms 233 carry at their lower ends depending legs 234.

Front and rear lateral shafts 235 are respectively turnably mounted between the respective pairs of front and rear legs 234. A roller 236 is mounted on each said shaft 235. Each said roller 236 has a plurality of transverse, annular flanges 237. In the working model illustrated, there are four of said flanges 237 on each of said rollers 236, one flange at each side of said rollers 236, and two intermediate flanges 237. Said flanges 237 are laterally spaced so that the distance between successive flanges is the same.

Additional lateral shafts 238 are also turnably mounted between the respective front and rear pairs of legs 234. Said shafts 238 are located longitudinally between and transversely below the shafts 235. Each said shaft 238 has fixed thereto a plurality of rollers 239. In this example, there are three such rollers 239. Each roller 239 is optionally of maximum diameter at its center and gradually decreases slightly in diameter towards each of its ends. The length of each said roller 239 is less than the space between successive flanges 237. Said rollers 239 are positioned with each said roller 239 centered with respect to a space between successive flanges 237.

This is clearly shown in Fig. 18. Said rollers 238 extend below the rollers 236.

Endless tapes 240 extend around said rollers 236 and under said rollers 239, in the manner shown in Fig. 19. Each said tape 240 serves the same function as the guide tapes 19a and 92 of previous embodiments. Each said tape 240 optionally and preferably comprises an inner layer 240a of canvas or the like and an outer facing layer 240b of sponge rubber or the like. Each said tape 240 extends substantially between successive flanges 237.

Each said tape 240 is individually tensioned, to allow for differences in length of said tapes 240. In order to tension said tapes 240, an additional lateral shaft 241 is fixed between the side arms 233 rearwardly of the front rollers 236 and 239. Three rocker frames are mounted on said shaft 241. Each said rocker frame comprises a pair of laterally spaced, transversely extending rocker arms 242 turnably mounted on said shaft 241. Said arms 242 are connected at their rear ends by a shaft 243, and at their front ends by a shaft 244. A roller 245 is turnably mounted on said shaft 244 between said rocker arms 242. Said shafts 244 and 243 are located below shaft 241.

Said rear shafts 243 are respectively connected by respective springs 246 to a cross piece 247 and hence to a cross arm 248, said cross arm 248 being connected between arms 231 rearwardly of said rocker arms 242. Each said roller 245 is located above a respective tape 240, as is clearly shown in Fig. 19, and extends substantially the width thereof. The action of each spring 246 tends to turn its associated rocker arms 242 in a counterclockwise direction, as taken in Fig. 19, so as to force the associated roller 245 against its associated tape 240 to maintain same under tension.

An important feature of this embodiment is that the tapes 240 bear against conveyor tape 8 below and between the front and rear rollers 239. As a result, it is possible to make the flanges 237 of substantially greater diameter than rollers 236, so that the tapes 240 do not protrude beyond the peripheries of said flanges 237. In contrast, in the two previous embodiments of the guide tape assemblies, it was necessary for the tapes 19a and 92 to protrude beyond their guide flanges. This is clearly shown in Fig. 4.

*Embodiment of Fig. 20*

A further problem in the processing of towels and similar articles of linen has been the amount of equipment and length of time necessary to dry said articles of linen after washing them and before ironing them. In the embodiment of Fig. 20, means are provided for applying heat to the articles while they are being loaded upon drum 3 in order to dry them. As a result, it is only necessary after washing the articles to make a preliminary extraction of water therefrom and then to load them upon drum 3, where the articles are further dried during the loading operation and also during the time interval before and while they are being fed to the ironer.

In the embodiment of Fig. 20, a plurality of electric heating lamps 401 are supported upon reflecting plate 400. This plate approximately corresponds in width to the length of drum 3 and is bent into approximately the shape of a two-hundred-seventy degree arc of a cylinder, as shown in Fig. 20. The ends of plate 400 are respectively fixed by angle irons 403 and 404 to frame 10. Plate 400 is spaced from the periphery of tape 8 when wound upon drum 3, as is also shown in Fig. 20. Plate 400 is held rigid by means of channels 402 attached to the respective side edges thereof and extending along the length thereof.

Optionally, plate 400 is further supported by means of handle 405 and bracket 406. Handle 405 is fixed to frame 10 near the bottom thereof and extends upwardly and rearwardly. Handle 405 serves as means for propulsion of the machine. Bracket 406 is fixed between the upper end of handle 405 and the outer face of plate 400 near the bottom thereof.

Lamps 401 are fixed to the inner face of plate 400 by any suitable means, including sockets. The mounting means for lamps 401 are conventional and will not be described in detail. Lamps 401 may be arranged in any suitable patterns and the inner face of plate 400 may have suitable heat-reflecting qualities, so as to apply selected head to drum 3. In the embodiment shown, the lamps are arranged in thirteen sets, each set having four laterally spaced lamps. The lamps are arranged over an arc of approximately one-hundred-eighty degrees and extend radially inwardly. Optionally, each lamp is a three-hundred-seventy-five watt lamp, so that almost twenty thousand watts of power are available for heating purposes.

Lamps 401 may be connected in any suitable electric circuit (not shown), which is preferably separate from the electric circuit of the remainder of the machine.

In operation, lamps 401 are optionally turned on at the start of the loading operation. As tape 8 is wound upon drum 3, an intense heat is applied to the outer face of the tape and hence to the articles of linen carried on the inner face thereof. Each successive layer of material wound upon drum 3 serves as an insulator to help retain the heat of previous layers. As a result, when tape 8 is wound to its maximum extent upon drum 3, all of its layers are heated, and the resulting roll is adapted to store heat for a substantial period of time, so as to dry the articles stored therein. Optionally, the lamps may be supplied with heat even after the close of the loading operation, so as to maintain the heat of the roll on drum 3.

*Summary of operation*

In view of the fact that the operations of the various component parts of the machine have been described in detail, it is believed sufficient at this point to give merely a brief over-all summary of the operation of the machine.

During the loading operation, plug P is plugged into socket L. Switch L–ON is manually closed. Light WL is lighted. During the loading operation, motor 7 is driven so as to wind tape 8 upon drum 3, motor 7a acting in the meantime as a brake to maintain tension upon tape 8. The operator controls the speed of motor 7 by turning knob 193. This regulates the speed of motor PM and thereby regulates the speed of travel of pulley belt 148. The difference in speed between pulley belt 148 and belt 145, which is driven by tape 8, is applied to the differential gear mechanism to control the setting of potentiometer wiper arm 178 and thereby control the grid bias of thyratrons 210 whereby to adjust the speed of motor 7.

The operator successively places articles of linen 111 upon tape 8 as it passes over roller 23. These articles 111 then pass over glass plate 24 and are illuminated by lights 110. The operator may thus inspect the articles for flaws.

Said articles 111 then pass between tape 8 and the guide tapes 19a. Said guide tapes 19a diverge in the direction of travel of articles 111, so as to spread same laterally. At the same time, said guide tapes 19a are oriented so as to tend to move tape 8 away from apron guide switch arm 89 while said tape 8 is touching said arm 89, and are further oriented in such a manner as to tend to move tape 8 toward said arm 89 while said tape 8 is out of contact with said arm 89.

If the operator discovers a flaw in an article 111 while it is passing over plate 24, and wishes to remove said article from its engagement between tape 8 and tapes 19a, the operator depresses foot pedal 117 so as to lower plate 20 and permit tape 8 to drop from its position of frictional engagement with tapes 19a. Simultaneously, switch button 227a is depressed, and motor 7 is stopped; and as a result, it is possible to remove the defective article 111 from said tape 8.

After the articles 111 pass beyond tapes 19a, they are stored around the periphery of drum 3.

At the end of the run, apron limit switch ALL is closed. As a result, motor 7 stops and conveyor 8 stops moving, warning bell SSB gives a single stroke, and light WL flashes instead of burning steadily.

If it is desired to stop the operation of the machine in the middle of the run, it is only necessary to depress switch L-OFF. This stops the operation of motor 7 and hence stops the movement of tape 8. In this case, light WL goes off.

In the feeding operation, plug P is plugged into socket F and button F-ON is manually actuated. The machine is moved into a position in which roller 182 is depressed by the input conveyor of the ironing machine, whereby motor PM is disengaged from belt 148, and said belt 148 is driven by the input conveyor belt of the ironing machine. Motor 7a becomes the drive motor, its speed being regulated by the speed of travel of said pulley belt 148. Motor 7 becomes the braking motor. The articles of linen 111 are discharged from belt 8 onto said input conveyor of said ironing machine. Tapes 19a have analogous functions to their functions during the loading operation. Analogously to the situation during the loading operation, the feeding operation may be stopped by actuating switch F-OFF, or when the corresponding apron limit switch ALF is closed. In addition, if switch TR is opened as a result of trouble in the folding operation which succeeds the ironing operation, the operation is terminated in the same manner as if switch F-OFF were operated.

I have disclosed preferred embodiments of my invention, and I have indicated various changes, omissions and additions which may be made therein. It will be apparent that various other changes, omissions and additions may be made in my invention without departing from the scope and spirit thereof.

I claim:

1. In a machine for the storage and feeding of articles of linen, said machine being of the type having a first drum and a storage drum with parallel spaced axes, a long tape wound upon said drums, driving means for turning said drums to unwind said tape from said first drum and at the same time wind said tape upon said storage drum, said storage drum being adapted to feed said articles of linen upon a moving conveyor positioned between said drums said means for turning said drums in their respective directions respectively comprising electric motors respectively coupled to said drums, each of said motors having a shunt field coil and also having a series circuit comprising an armature coil and a commutator field coil connected in series, a first switch, a series field coil, said armature coil and said commutator field coil being together connected through said first switch in series with said series field coil, an adjustable resistance load, and a second switch, said armature coil and said commutator field coil being together connected through said second switch in parallel with said load, and a power supply for said motors, said power supply comprising a source of constant direct voltage connected across both of said shunt coils, a source of constant alternating voltage, a transformer comprising a primary connected across said source of alternating voltage and a plurality of secondaries, and a pair of thyratrons each having a cathode, a grid and a plate, one of said secondaries being connected between said plates and having a center tap connected to one end of each of said motor series circuits, the other ends of said motor series circuits being connected to each other and to said cathodes, a second transformer having a primary and having a center-tapped secondary connected between said grids, a phase-shifting network coupling another of said first-mentioned secondaries and said second primary, and a source of variable direct voltage connected at its positive side of the center tap of said secondary of said second transformer and at its negative side to said cathodes, means for closing the first switch of a first motor and the second switch of the second motor while maintaining the other switches open, said first motor being thereby energized to drive its associated drum in a direction to wind said tape thereon at a speed dependent upon the value of said variable direct voltage, the other drum being thereby turned in a direction to unwind said tape therefrom and thereby generating an electric current in the armature coil of its motor, the value of the adjustable resistance load of said second motor determining the resulting resistance offered to the unwinding movement of said other drum, and means for closing the first switch of the second motor and the second switch of the first motor while maintaining the other switches open, whereby to reverse the action of said drums.

2. In a machine for the storage and feeding of articles of linen, said machine being of the type having a first drum and a storage drum with parallel spaced axes, a long tape wound upon said drums, driving means for turning said drums to unwind said tape from said first drum and at the same time wind said tape upon said storage drum, said storage drum being adapted to feed said articles of linen upon a moving conveyor positioned between said drums said means for turning said drums in their respective directions respectively comprising electric motors, each said motor comprising a field element fixed to said frame and a co-operating coil-wound rotor element fixed to a respective drum, a circuit load for said coil, and a power supply for said coil, means for connecting the coil of a first motor across said power supply and for connecting the load of the second motor across the coil thereof, said first motor being thereby energized to drive its associated drum in the direction to wind said tape thereon the other drum being thereby turned in a direction to unwind said tape therefrom and thereby generating an electric current in the coil of its motor, the presence of the circuit load of said motor causing a resulting resistance to the unwinding movement of said other drum and hence tensioning said tape, and means for connecting the coil of the second motor across said power supply and for connecting the load of said first motor across the coil thereof, whereby to reverse the action of said drums.

3. In a machine for the storage and feeding of articles of linen, said machine being of the type having a first drum and a storage drum with parallel spaced axes, a long tape wound upon said drums, driving means for turning said drums to unwind said tape from said first drum and at the same time wind said tape upon said storage drum, said storage drum being adapted to feed said articles of linen upon a moving conveyor positioned between said drums each said drive means including a switch, an idler roller turnably mounted on said frame with the peripheral face of said roller turnably and frictionally abutting a first face of the said tape, said switch including an actuating lever pivotally mounted thereon, an end of said lever being positioned and movable to be proximate to the second face of said tape opposite said peripheral wall of said roller, and spring means holding said lever end in said proximity with said second face of said tape, whereby said lever actuates said switch to maintain said drive means operative, and means for stopping the operation of said drive means, said stop means comprising a thickened pad affixed to at least one face of said tape and adapted to pass between said roller and said lever end during the movement of said tape, and whereby said lever is moved against the action of said spring means to actuate said switch to maintain said drive means inoperative.

4. In a machine for the storage and feeding of articles of linen, said machine being of the type having a first drum and a storage drum with parallel spaced axes, a long tape wound upon said drums, driving means for turning said drums to unwind said tape from said first drum and at the same time wind said tape upon said storage drum, said storage drum being adapted to feed said articles of linen upon a moving conveyor positioned between said drums said tape moving in the general direction of a longitudinal axis, said machine also comprising a longitudinal guide mechanism for said tape, said mechanism comprising mounting means pivotally mounted on said frame for movement about a transverse axis, a pair of idler members mounted on said mounting means, said mounting means having a generally longitudinally extending axis, said idler members being laterally spaced and being respectively elongated and movable in the general direction of the axis of said mounting means, means maintaining one face of said tape in frictional driving abutment with said idler members whereby said idler members tend to move said tape in the direction of the axis of said mounting means, and means for turning said mounting means between a first position in which the axis thereof is inclined relative to the axis of movement of said tape towards one side edge of said tape and a second position in which the axis of said mounting means is inclined relative to the axis of movement of said tape towards the other side edge of said tape, said turning means for said mounting means including switch means positioned proximate to said first-mentioned side edge of said tape and in substantial lateral registration with said transverse axis and positioned and adapted to be operatively engaged by said side edge of said tape, said turning means for said mounting means maintaining said mounting means in its first position when said tape is out of engagement with said switch means, whereby said idler members tend to move said tape towards said first mentioned side edge, said turning means for said mounting means maintaining said mounting means in its second position when said tape operatively engages said switch means, whereby said idler members tend to move said tape towards said other side edge.

5. In a machine for the storage and feeding of articles of linen, said machine being of the type having a first drum and a storage drum with parallel spaced axes, a long tape wound upon said drums, driving means for turning said drums to unwind said tape from said first drum and at the same time wind said tape upon said storage drum, said storage drum being adapted to feed said articles of linen upon a moving conveyor positioned between said drums said tape moving in the general direction of a longitudinal axis, said machine also comprising a lateral spreader mechanism for said tape, said mechanism comprising a pair of idler members mounted on said frame in frictional abutment with a face of said tape and turnable about respective transverse axes, said idler members being laterally spaced and being respectively elongated and movable in a generally longitudinal direction, and means for turning said idler members so that they diverge in the direction of movement of said tape, whereby articles of linen and the like carried by said tape between said tape and said idler members are spread laterally by said idler members.

6. In a machine for the storage and feeding of articles of linen, said machine being of the type having a first drum and a storage drum with parallel spaced axes, a long tape wound upon said drums, driving means for turning said drums to unwind said tape from said first drum and at the same time wind said tape upon said storage drum, said storage drum being adapted to feed said articles of linen upon a moving conveyor positioned between said drums, said machine also including a speed regulation device, said speed regulation device comprising a pair of input members, means coupling said tape to one of said input members for turning said input member at speed proportional to the speed of tape movement and in a direction corresponding to the direction of tape movement, means for independently turning the other input member in a selected direction at a selected rate of speed, output means coupled to each of said input members and adapted to turn at a speed and in a direction dependent upon the difference in the speeds of said input members, an arm mounted on said frame and movable between two end positions, means coupling said output member and said arm, whereby said turning of said output member causes movement of said arm towards a corresponding end position thereof, and means coupling said arm and said power means for causing a resulting change in drum speed such as to tend to cause a reversal in the direction of turning of said output member.

7. A machine in accordance with claim 2, said power supply including a switch, an idler roller turnably mounted on said frame with the peripheral face of said roller turnably and frictionally abutting a first face of said tape, such switch including an actuating lever pivotally mounted thereon, an end of said lever being positioned and movable to a position of proximity with the second face of said tape opposite said peripheral wall of said roller, and spring means holding said lever end in said proximity with said second face of said tape, whereby said lever actuates said switch to maintain said power supply operative, and means for stopping the operation of said power supply, said stop means comprising a thickened pad affixed to at least one face of said tape and adapted to pass between said roller and said lever end during the movement of said tape, whereby said lever is moved against the action of said spring means to actuate said switch to maintain said power supply inoperative.

8. A machine in accordance with claim 2, said tape moving in the general direction of a longitudinal axis, said machine also comprising a longitudinal guide mechanism for said tape, said mechanism comprising mounting means pivotally mounted on said frame for movement about a transverse axis, a pair of idler members mounted on said mounting means, said mounting means having a generally longitudinally extending axis, said idler members being laterally spaced and being respectively elongated and movable in the general direction of the axis of said mounting means, means maintaining one face of said tape in frictional abutment with said idler members, whereby said idler members tend to move said tape in the direction of the axis of said mounting means, and means for turning said mounting means between a first position in which the axis thereof is inclined relative to the axis of movement of said tape towards one side edge of said tape and a second position in which the axis of said mounting means is inclined relative to the axis of movement of said tape towards the other side edge of said tape, said turning means for said mounting means including switch means positioned proximate to said first-mentioned side edge of said tape and in substantial lateral registration with said transverse axis and positioned and adapted to be operatively engaged by said side edge of said tape, said turning means for said mounting means maintaining said mounting means in its first position when said tape is out of engagement with said switch means, whereby said idler members tend to move said tape towards said first-mentioned side edge, said turning means for said mounting means maintaining said mounting means in its second position when said tape operatively engages said switch means, whereby said idler members tend to move said tape towards said other side edge.

9. A machine in accordance with claim 2, said tape moving in the general direction of a longitudinal axis, said machine also comprising a lateral spreader mechanism for said tape, said mechanism comprising a pair of idler members mounted on said frame in frictional abutment with a face of said tape and turnable about respective transverse axes, said idler members being laterally spaced and being respectively elongated and movable in a generally longitudinal direction, and means for turning said idler members so that they diverge in the direction of movement of said tape, whereby articles of linen and the like carried by said tape between said tape and said idler members are spread laterally by said idler members.

10. A machine in accordance with claim 2, said power supply also comprising a potentiometer coil, a source of voltage connected across said potentiometer coil, said potentiometer coil having a reversibly movable contact arm, the voltage drop between potentiometer arm and one of the fixed terminals of said potentiometer coils serving as said power supply for said motor coils, said potentiometer coil carrying a pair of stop means serving as respective limits for movement of said potentiometer arm in either direction, said machine also including a speed regulation device, said speed regulation device comprising a shaft turnably mounted on said frame, a pair of drive gear wheels turnably mounted on said shaft and spaced from each other, means coupling said tape to one of said drive gears for turning said drive gear at a speed proportional to the speed of tape movement and in a direction corresponding to the direction of tape movement, means for independently turning the other drive gear in the opposite direction at a selected rate of speed, means coupled to each of said drive gears and also to said shaft for turning said shaft at a speed and in a direction dependent upon the difference in the speeds of said drive gears, and means including a slip clutch coupling said shaft and said potentiometer arm, whereby said turning of said shaft causes movement of said potentiometer arm towards a corresponding limit position thereof, the resulting change in drum speed tending to cause a reversal in the direction of turning of said shaft.

11. A machine in accordance with claim 3, said tape moving in the general direction of a longitudinal axis, said machine also comprising a longitudinal guide mechanism for said tape, said mechanism comprising mounting means pivotally mounted on said frame for movement about a transverse axis, a pair of idler members mounted on said mounting means, said mounting means having a generally longitudinally extending axis, said idler members being laterally spaced and being respectively elongated and movable in the general direction of the axis of said mounting means, means maintaining one face of said tape in frictional abutment with said idler members, whereby said idler members tend to move said tape in the direction of the axis of said mounting means, and means for turning said mounting means between a first position in which the axis thereof is inclined relative to the axis of movement of said tape towards one side edge of said tape and a second position in which the axis of said mounting means is inclined relative to the axis of movement of said tape towards the other side edge of said tape, said turning means for said mounting means including switch means positioned proximate to said first-mentioned side edge of said tape and in substantial lateral registration with said transverse axis and positioned and adapted to be operatively engaged by said side edge of said tape, said turning means for said mounting means maintaining said mounting means in the first position when said tape is out of engagement with switch means, whereby said idler members tend to move said tape towards said first-mentioned side-edge, said turning means for said mounting means maintaining said mounting means in its second position when said tape operatively engages switch means, whereby said idler members tend to move said tape towards other side edge.

12. A machine in accordance with claim 3, said tape moving in the general direction of a longitudinal axis, said machine also comprising a lateral spreader mechanism for said tape, said mechanism comprising a pair of idler members mounted on said frame in frictional abutment with a face of said tape and turnable about respective transverse axes, said idler members being laterally spaced and being respectively elongated and movable in a generally longitudinal direction, and means for turning said idler members so that they diverge in the direction of movement of said tape, whereby articles of linen and the like carried by said tape between said tape and said idler members are spread laterally by said idler members.

13. A machine in accordance with claim 3, said machine also including a speed regulation device, said speed regulation device comprising a pair of input members, means coupling said tape to one of said input members for turning said input member at a speed proportional to the speed of tape movement and in a direction corresponding to the direction of tape movement, means for independently turning the other input member in a selected direction at a selected rate of speed, an output member coupled to each of said input members and adapted to turn at a speed and in a direction dependent upon the difference in the speeds of said input members, an arm mounted on said frame and movable between two end positions, means coupling said output member and said arm, whereby said turning of said output member causes movement of said arm towards a corresponding end position thereof, and means coupling said arm and said power means for causing a resulting change in drum speed such as to tend to cause a reversal in the direction of turning of said output member.

14. A machine in accordance with claim 4, said idler members being mounted on said mounting means so as to be turnable about respective transverse axes, said mounting means carrying means for reversibly turning said idler members about their transverse axes so that they diverge in the direction of movement of said tape, whereby articles of linen and the like carried by said tape between said tape and said idler members are spread laterally by said idler members.

15. A machine in accordance with claim 4, said machine also including a speed regulation device, said speed regulation device comprising a pair of input members, means coupling said tape to one of said input members for turning said input member at a speed proportional to the speed of tape movement and in a direction corresponding to the direction of tape movement, means for independently turning the other input member in a selected direction at a selected rate of speed, an output member coupled to each of said input members and adapted to turn at a speed and in a direction dependent upon the difference in the speeds of said input members, an arm mounted on said frame and movable between two ends positions, means coupling said output member and said arm, whereby said turning of said output member causes movement of said arm towards a corresponding end position thereof and means coupling said arm and said power means for causing a resulting change in drum speed such as to tend to cause a reversal in the direction of turning of said output member.

16. A machine in accordance with claim 5, said machine also including a speed regulation device, said speed regulation device comprising a pair of input members, means coupling said tape to one of said input members for turning said input member at a speed proportional to the speed of tape movement and in a direction corresponding to the direction of tape movement, means for independently turning the other input member in a selected direction at a selected rate of speed, an output member coupled to each of said input members and adapted to turn at a speed and in a direction dependent upon the difference in the speeds of said input members, an arm mounted on said frame and movable between two end positions, means coupling said output member and said arm, whereby said turning of said output member causes movement of said arm towards a corresponding end position thereof and means coupling said arm and said power means for causing a resulting change in drum speed such as to tend to cause a reversal in the direction of turning of said output member.

17. A machine in accordance with claim 7, said tape moving in the general direction of a longitudinal axis, said machine also comprising a longitudinal guide mechanism for said tape, said mechanism comprising mounting means pivotally mounted on said frame for movement about a transverse axis, a pair of idler members mounted on said mounting means, said mounting means having a generally longitudinally extending axis, said idler members being laterally spaced and being respectively elongated and movable in the general direction of the axis of said mounting means, means maintaining one face of said tape in frictional abutment with said idler members, whereby said idler members tend to move said tape in the direction of the axis of said mounting means, and means for turning said mounting means between a first position in which the axis thereof is inclined relative to the axis of movement of said tape towards one side edge of said tape and a second position in which the axis of said mounting means is inclined relative to the axis of movement of said tape towards the other side edge of said tape, said turning means for said mounting means including switch means positioned proximate to said first-mentioned side edge of said tape and in substantial registration with said transverse axis and positioned and adapted to be operatively engaged by said side edge of said tape, said turning means for said mounting means maintaining said mounting means in its first position when said tape is out of engagement with said switch means, whereby said idler members tend to move said tape towards said first-mentioned side edge, said turning means for said mounting means maintaining said mounting means in its second position when said tape operatively engages said switch means, whereby said idler members tend to move said tape towards said other side edge.

18. A machine in accordance with claim 7, said tape moving in the general direction of a longitudinal axis, said machine also comprising a lateral spreader mechanism for said tape, said mechanism comprising a pair of idler members mounted on said frame in frictional abutment with a face of said tape and turnable about respective transverse axes, said idler members being laterally spaced and being respectively elongated and movable in a generally longitudinal direction, and means for turning said idler members so that they diverge in the direction of movement of said tape, whereby articles of linen and the like carried by said tape between said tape and said idler members are spread laterally by said idler members.

19. A machine in accordance with claim 7, said power supply also comprising a potentiometer coil, a source of voltage connected across said potentiometer coil, said potentiometer coil having a reversibly movable contact arm, the voltage drop between said potentiometer arm and one of the fixed terminals of said potentiometer coil serving as said power supply for said motor coils, said potentiometer coil carrying a pair of stop means serving as respective limits for movement of said potentiometer arm in either direction, said machine also including a speed regulation device, said speed regulation device comprising a shaft turnably mounted on said frame, a pair of drive gear wheels turnably mounted on said shaft and spaced from each other, means coupling said tape to one of said drive gears for turning said drive gear at a speed proportional to the speed of tape movement and in a direction corresponding to the direction of tape movement, means for independently turning the other drive gear in the opposite direction at a selected rate of speed, means coupled to each of said drive gears and also to said shaft for turning said shaft at a speed and in a direction dependent upon the difference in the speeds of said drive gears, and means including a slip clutch coupling said shaft and said potentiometer arm, whereby said turning of said shaft causes movement of said potentiometer arm towards a corresponding limit position thereof, the resulting change in drum speed tending to cause a reversal in the direction of said shaft.

20. A machine in accordance with claim 8, said idler members being mounted on said mounting means so as to be turnable about respective transverse axes, said mounting means carrying means for reversibly turning said idler members about their transverse axes so that they diverge in the direction of movement of said tape, whereby articles of linen and the like carried by said tape between said tape and said idler members are spread laterally by said idler members.

21. A machine in accordance with claim 8, said power supply also comprising a potentiometer coil, a source of voltage connected across said potentiometer coil, said potentiometer coil having a reversibly movable contact arm, the voltage drop between said potentiometer arm and one of the fixed terminals of said potentiometer coil serving as said power supply for said motor coils, said potentiometer coil carrying a pair of stop means serving as respective limits for movement of said potentiometer arm in either direction, said machine also including a speed regulation device, said speed regulation device comprising a shaft turnably mounted on said frame, a pair of drive gear wheels turnably mounted on said shaft and spaced from each other, means coupling said tape to one of said drive gears for turning said drive gear at a speed proportional to the speed of tape movement and in a direction corresponding to the direction of tape movement, means for independently turning the other drive gear in the opposite direction at a selected rate of speed, means coupled to each of said drive gears and also to said shaft for turning said shaft at a speed and in a direction dependent upon the difference in the speeds of said drive gears, and means including a slip clutch coupling said shaft and said potentiometer arm, whereby said turning of said shaft causes movement of said potentiometer arm towards a corresponding limit position thereof, the resulting change in drum speed tending to cause a reversal in the direction of turning of said shaft.

22. A machine in accordance with claim 9, said power supply also comprising a potentiometer coil, a source of direct voltage connected across said potentiometer coil, said potentiometer coil having a reversibly movable contact arm, the voltage drop between said potentiometer arm and one of the fixed terminals of said potentiometer coil serving as said power supply for said motor coils, said potentiometer coil carrying a pair of stop means serving as respective limits for movement of said potentiometer arm in either direction, said machine also including a speed regulation device, said speed regulation device comprising a shaft turnably mounted on said frame, a pair of drive gear wheels turnably mounted on said shaft and spaced from each other, means coupling said tape to one of said drive gears for turning said drive gear at a speed proportional to the speed of tape movement and in a direction corresponding to the direction of tape movement, means for independently turning the other drive gear in the opposite direction at a selected rate of speed, means coupled to each of said drive gears and also to said shaft for turning said shaft at a speed and in a direction dependent upon the difference in the speeds of said drive gears, and means including a slip clutch coupling said shaft and said potentiometer arm, whereby said turning of said shaft causes movement of said potentiometer arm towards a corresponding limit position thereof, the resulting change in drum speed tending to cause a reversal in the direction of turning of said shaft.

23. A machine in accordance with claim 11, said idler members being mounted on said mounting means so as to be turnable about respective transverse axes, said mounting means carrying means for reversibly turning said idler members about their transverse axes so that they diverge in the direction of movement of said tape, whereby articles of linen and the like carried by said tape between said tape and said idler members are spread laterally by said idler members.

24. A machine in accordance with claim 3, said machine also including a speed regulation device, said speed regultion device comprising a pair of input members, means coupling said tape to one of said input members for turning said input member at a speed proportional to the speed of tape movement and in a direction corresponding to the direction of tape movement, means for independently turning the other input member in a selected direction at a selected rate of speed, an output member coupled to each of said input members and adapted to turn at a speed and in a direction dependent upon the difference in the speeds of said input members, an arm mounted on said frame and movable between two end positions, means coupling said output member and said arm, whereby said turning of said output member causes movement of said arm towards a corresponding end position thereof and means coupling said arm and said power means for causing a resulting change in drum speed such as to tend to cause a reversal in the direction of turning of said output member.

25. A machine in accordance with claim 12, said machine also including a speed regulation device, said speed regulation device comprising a pair of input members, means coupling said tape to one of said input members for turning said input member at a speed proportional to the speed of tape movement and in a direction corresponding to the direction of tape movement, means for independently turning the other input member in a selected direction at a selected rate of speed, an output member coupled to each of said input members and adapted to turn at a speed and in a direction dependent upon the difference in the speeds of said input members, an arm mounted on said frame and movable between two end positions, means coupling said output member and said arm, whereby said turning of said output member causes movement of said arm towards a corresponding end position thereof and means coupling said arm and said power means for causing a resulting change in drum speed such as to tend to cause a reversal in the direction of turning of said output member.

26. A machine in accordance with claim 14, said machine also including a speed regulation device, said speed regulation device comprising a pair of input members, means coupling said tape to one of said input members for turning said input member at a speed proportional to the speed of tape movement and in a direction corresponding to the direction of tape movement, means for independently turning the other input member in a selected direction at a selected rate of speed, an output member coupled to each of said input members and adapted to turn at a speed and in a direction dependent upon the difference in the speeds of said input members, an arm mounted on said frame and movable between two end positions, means coupling said output member and said arm, whereby said turning of said output member causes movement of said arm towards a corresponding end position thereof and means coupling said arm and said power means for causing a resulting change in drum speed such as to tend to cause a reversal in the direction of turning of said output member.

27. A machine in accordance with claim 17, said idler members being mounted on said mounting means so as to be turnable about respective transverse axes so that they diverge in the direction of movement of said tape, whereby articles of linen and the like carried by said tape between said tape and said idler members are spread laterally by said idler members.

28. A machine in accordance with claim 17, said power supply also comprising a potentiometer coil, a source of voltage connected across said potentiometer coil, said potentiometer coil having a reversibly movable contact arm, the voltage drop between said potentiometer arm and one of the fixed terminals of said potentiometer coil serving as said power supply for said motor coils, said potentiometer coil carrying a pair of stop means serving as respective limits for movement of said potentiometer arm in either direction, said machine also including a speed regulation device, said speed regulation device comprising a shaft turnably mounted on said frame, a pair of drive gear wheels turnably mounted on said shaft and spaced from each other, means coupling said tape to one of said drive gears for turning said drive gear at a speed proportional to the speed of tape movement and in a direction corresponding to the direction of tape movement, means for independently turning the other drive gear in the opposite direction at a selected rate of speed, means coupled to each of said drive gears and also to said shaft for turning said shaft at a speed and in a direction dependent upon the difference in the speeds of said drive gears, and means including a slip clutch coupling said shaft and said potentiometer arm, whereby said turning of said shaft causes movement of said potentiometer arm towards a corresponding limit position thereof, the resulting change in drum speed tending to cause a reversal in the direction of turning of said shaft.

29. A machine in accordance with claim 18, said power supply also comprising a potentiometer coil, a source of voltage connected across said potentiometer coil, said potentiometer coil having a reversibly movable contact arm, the voltage drop between said potentiometer arm and one of the fixed terminals of said potentiometer coil serving as said power supply for said motor coils, said potentiometer coil carrying a pair of stop means serving as respective limits for movement of said potentiometer arm in either direction, said machine also including a speed regulation device, said speed regulation device comprising a shaft turnably mounted on said frame, a pair of drive gear wheels turnably mounted on said shaft and spaced from each other, means coupling said tape to one of said drive gears for turning said drive gear at a speed proportional to the speed of tape movement and in a direction corresponding to the direction of tape movement, means for independently turning the other drive gear in the opposite direction at a selected rate of speed, means coupled to each of said drive gears and also to said shaft for turning said shaft at a speed and in a direction dependent upon the difference in the speeds of said drive gears, and means including a slip clutch coupling said shaft and said potentiometer arm, whereby said turning of said shaft causes movement of said potentiometer arm towards a corresponding limit position thereof, the resulting change in drum speed tending to cause a reversal in the direction of turning of said shaft.

30. A machine in accordance with claim 20, said power supply also comprising a potentiometer coil, a source of voltage connected across said potentiometer coils, said potentiometer coil having a reversibly movable contact arm, the voltage drop between said potentiometer arm and one of the fixed terminals of said potentiometer coil serving as said power supply for said motor coils, said potentiometer coil carrying a pair of stop means serving as respective limits for movement of said potentiometer arm in either direction, said machine also including a speed regulation device, said speed regulation device comprisng a shaft turnably mounted on said frame, a pair of drive gear wheels turnably mounted on said shaft and spaced from each other, means coupling said tape to one of said drive gears for turning said drive gear at a speed proportional to the speed of tape movement and in a direction corresponding to the direction of tape movement, means for independently turning the other drive gear in the opposite direction at a selected rate of speed, means coupled to each of said drive gears and also to said shaft for turning said shaft at a speed and in a direction dependent upon the difference in the speeds of said drive gears, and means including a slip clutch coupling said shaft and said potentiometer arm, whereby said turning of said shaft causes movement of said potentiometer arm towards a corresponding limit position thereof, the resulting change in drum speed tending to cause a reversal in the direction of turning of said shaft.

31. A machine in accordance with claim 23, said machine also including a speed regulation device, said speed regulation device comprising a pair of input members, means coupling said tape to one of said input members for turning said input member at a speed proportional to the speed of tape movement and in a direction corresponding to the direction of tape movement, means for independently turning the other input member in a selected direction at a selected rate of speed, an output member coupled to each of said input members and adapted to turn at a speed and in a direction dependent upon the difference in the speeds of said input members, an arm mounted on said frame and movable between two end positions, means coupling said output member and said arm, whereby said turning of said output member causes movement of said arm towards a corresponding end position thereof and means coupling said arm and said power means for causing a resulting change in drum speed such as to tend to cause a reversal in the direction of turning of said output member.

32. A machine in accordance with claim 27, said power supply also comprising a potentiometer coil, a source of voltage connected across said potentiometer coils, said potentiometer coil having a reversibly movable contact arm, the voltage drop between said potentiometer arm and one of the fixed terminals of said potentiometer coil serving as said power supply for said motor coils, said potentiometer coil carrying a pair of stop means serving as respective limits for movement of said potentiometer arm in either direction, said machine also including a speed regulation device, said speed regulation device comprising a shaft turnably mounted on said frame, a pair of drive gear wheels turnably mounted on said shaft and spaced from each other, means coupling said tape to one of said drive gears for turning said drive gear at a speed proportional to the speed of tape movement and in a direction corresponding to the direction of tape movement, means for independently turning the other drive gear in the opposite direction at a selected rate of speed, means coupled to each of said drive gears and also to said shaft for turning said shaft at a speed and in a direction dependent upon the difference in the speeds of said drive gears, and means including a slip clutch coupling said shaft and said potentiometer arm, whereby said turning of said shaft causes movement of said potentiometer arm towards a corresponding limit position thereof, the resulting change in drum speed tending to cause a reversal in the direction of turning of said shaft.

33. A reversible conveyor comprising a frame, a pair of spaced drums turnably mounted on said frame and having parallel axes, a long tape having one end portion thereof wound on one drum and the other end portion thereof wound on the other drum and extending between said drums, motors respectively coupled to both of said drums, each of said motors having a shunt field coil, each of said motors also having a series circuit comprising an armature coil and a commutator field coil connected in series, a first switch, a series field coil, said armature coil and said commutator field coil being together connected through said first switch in series with said series field coil, an adjustable resistance load, and a second switch, said armature coil and said commutator field coil being together connected through said second switch in parallel with said load, and a power supply for said motors, said power supply comprising a source of constant direct voltage connected across both of said shunt coils, a source of constant alternating voltage, a transformer comprising a primary connected across said source of alternating voltage and a plurality of secondaries, and a pair of thyratrons each having a cathode, a grid and a plate, one of said secondaries being connected between said plates and having a center tap connected to one end of each of said motor series circuits, the other ends of said motor series circuits being connected to each other and to said cathodes, a second transformer having a primary and having a center-tapped secondary connected between said grids, a phase-shifting network coupling another of said first-mentioned secondaries and said second primary, and a source of variable direct voltage connected at its positive side to the center tap of said secondary of said second transformer and at its negative side to said cathodes, means for closing the first switch of a first motor and the second switch of the second motor while maintaining the other switches open, said first motor being thereby energized to drive its associated drum in a direction to wind said tape thereon at a speed dependent upon the value of said variable direct voltage, the other drum being thereby turned in a direction to unwind said tape therefrom and thereby generating an electric current in the armature coil of its motor, the value of the adjustable resistance load of said second motor determining the resulting resistance offered to the unwinding movement of said other drum, and means for closing the first switch of the second motor and the second switch of the first motor while maintaining the other switches open, whereby to reverse the action of said drum.

34. A reversible conveyor comprising a frame, a pair of spaced drums turnably mounted on said frame and having parallel axes, a long tape having one end portion thereof wound on one drum and the other end portion thereof wound on the other drum and extending between said drums, identical motors respectively coupled to both of said drums, each of said motors comprising a field-element fixed to said frame and a co-operating coil-wound rotor element fixed to a respective drum, a circuit load for said coil, and a power supply for said coil, means for connecting the coil of a first motor across said power supply voltage and for connecting the load of the second motor across the coil thereof, said motor being thereby energized to drive its associated drum in a direction to wind said tape thereon, the other drum being thereby turned in a direction to unwind said tape therefrom and thereby generating an electric current in the armature coil of its motor, the presence of the circuit load of said second motor causing a resulting resistance to the unwinding movement of said other drum and hence tensioning said tape, and means for connecting the coil of the second motor across said power supply and for connecting the load of said first motor across the coil thereof, whereby to reverse the action of said drums.

35. In combination, a frame, a long conveyor tape of selected thickness, drive means mounted on said frame for supporting said tape and for moving said tape longitudinally, said drive means including a switch, an idler roller turnably mounted on said frame with the peripheral face of said roller turnably and frictionally abutting a first face of said tape, said switch including an actuating lever pivotally mounted thereon, an end of said lever being positioned and movable to be proximate to the second face of said tape opposite said peripheral wall of said roller, and spring means holding said lever end in said proximity with said second face of said tape, whereby said lever actuates said switch to maintain said drive means operative, and means for stopping the operation of said drive means, said stop means comprising a thickened pad affixed to at least one face of said tape and adapted to pass between said roller and said lever end during the movement of said tape, whereby said lever is moved against the action of said spring means to actuate said switch to maintain said drive means inoperative.

36. In combination, a movable tape assembly and longitudinal guide mechanism therefor, comprising a frame having a longitudinal axis, a long tape, means mounted on said frame for supporting said tape and for maintaining said tape under longitudinal tension and for moving said tape in the general direction of said longitudinal axis, mounting means pivotally mounted on said frame for movement about a transverse axis, a pair of idler members on said mounting means, said mounting means having a generally longitudinally extending axis, said idler members being laterally spaced and being respectively elongated and movable in the general direction of the axis of said mounting means, means maintaining one face of said tape in frictional abutment with said idler members, whereby said idler members tend to move said tape in the direction of the axis of said mounting means, and means for turning said mounting means between a first position in which the axis thereof is inclined relative to the axis of movement of said tape towards one side edge of said tape and a second position in which the axis of said mounting means is inclined relative to the axis of movement of said tape towards the other side edge of said tape, said turning means for said mounting means including switch means positioned proximate to said first-mentioned side edge of said tape and in substantial lateral alinement with said transverse axis and positioned and adapted to be operatively engaged by said side edge of said tape, said turning means for said mounting means maintaining said mounting means in its first position when said tape is out of engagement with said switch means, whereby said idler members tend to move said tape towards said first-mentioned side edge, said turning means for said mounting means maintaining said mounting means in its second position when said tape operatively engages said switch means, whereby said idler members tend to move said tape towards said other side edge.

37. A combination in accordance with claim 36, said turning means for said mounting means also including a pair of laterally spaced, longitudinally extending dashpots mounted upon said frame rearwardly of said mounting means with the axis of turning of said mounting means disposed laterally between said dashpots, each said dashpot comprising a casing having a cylindrical bore and having front and rear walls, said rear wall having an opening communicating with the atmosphere and with said bore, an adjustable valve in said rear wall opening, a piston axially slidably located within said bore, said front wall having a central aperture, a piston rod extending through said aperture, the rear end of said piston rod carrying a ball, said piston having a central socket on the front face thereof, said ball being held in said socket and being universally movable therein, means respectively coupling the front ends of said piston rods to said mounting means on opposite sides of the turning axis thereof, and an annular, flexible gasket mounted on the inner face of said front wall, said piston rod extending frictionally through the opening of said gasket, said valve being adjustable so that said dashpot furnishes selected resistance to axial movement in either direction of said piston rod.

38. A combination in accordance with claim 36, each said idler member comprising an idler frame having a top wall and depending side walls, a pair of cylindrical, lateral rollers respectively turnably mounted between said side walls at the front and rear of said idler frame, each said roller having annular, transverse flanges at the ends of its peripheral wall and also at intermediate points on said peripheral wall, whereby said roller is divided into a plurality of roller segments, the segments of one roller being longitudinally alined and paired with the corresponding segments of the other roller, a pair of lateral shafts respectively turnably mounted between said side walls and between said rollers, a plurality of laterally spaced roller members mounted on each shaft, each pair of roller segments having front and rear shaft roller members longitudinally alined and forming a set therewith, said shaft roller members all extending below said flanges, a flexible endless belt extending frictionally around each set of roller segments and shaft roller members and extending between the end flanges of said respective roller segments, said shaft roller members being of less width than said belts, each said shaft roller member being generally cylindrical in shape but decreasing gradually and slightly in diameter from its center towards both of its ends, whereby to tend to spread laterally the belt mounted thereon, and individually tensioning members supported by said idler frame above said belts and respectively adapted to bear against said belts and maintain them taut regardless of individual variances in belt length.

39. A combination in accordance with claim 36, said turning means for said mounting means comprising a pair of laterally spaced, longitudinally extending solenoids mounted upon said frame forwardly of said mounting means with the axis of turning of said mounting means disposed laterally between said solenoids, said solenoids respectively having plungers extending rearwardly thereof, means respectively coupling said plungers to said mounting means on opposite sides of the turning axis thereof, each said plunger being adapted to be drawn forwardly when its associated solenoid is energized and thereby causing corresponding turning of said mounting means and rearward movement of the other plunger, a source of voltage, a relay, said switch means and said relay being connected in series across said source of voltage, said relay having a first pair of contacts which are open when said relay switch is open and closed when said relay switch is closed, and a second pair of contacts which are closed when said relay switch is open and open when said relay switch is closed, a source of direct voltage, means for connecting the first pair of relay contacts and the solenoid proximate to said relay switch in series across said source of direct voltage and for connecting the second pair of relay contacts and the solenoid remote from said relay switch in series across said source of direct voltage when said tape is moving forwardly, and means for connecting the second pair of relay contacts and the solenoid proximate to said relay switch in series across said source of direct voltage and for connecting the first pair of relay contacts and the solenoid remote from said relay switch in series across said source of direct voltage when said tape is moving rearwardly.

40. A combined lateral spreader and longitudinal guide mechanism for a long tape which is supported by a frame for reversible movement in the general direction of a longitudinal axis under longitudinal tension, said tape being adapted to convey articles of linen and the like on one face thereof, said spreader and guide mechanism comprising mounting means pivotally mounted on said frame for movement about a transverse axis and having a generally longitudinally extending axis, a pair of idler members mounted on said mounting means so as to be turnable about respective laterally spaced transverse axes, means supported by said mounting means for maintaining said idler members with their respective axes extending generally longitudinally and for reversibly turning said idler members about their transverse axes so that they diverge in the direction of movement of said tape, said idler members being respectively axially elongated and axially movable, and means maintaining said face of said tape in frictional abutment with said idler members, whereby said idler members tend to move said tape in the direction of the axis of said mounting means and whereby articles of linen and the like carried on said face of said tape between said tape and said idler members are spread laterally by said idler members, and means for turning said mounting means between a first position in which the axis thereof is inclined relative to the axis of movement of said tape towards one side edge of said tape and a second position in which the axis of said mounting means is inclined relative to the axis of movement of said tape towards the other side edge of said tape, said turning means for said mounting means including switch means positioned proximate to said first-mentioned side edge of said tape and in substantial lateral alinement with said transverse axis and positioned and adapted to be operatively engaged by said side edge of said tape, said turning means for said mounting means maintaining said mounting means in its first position when said tape is out of engagement with said switch means, whereby said idler members tend to move said tape towards said first-mentioned side edge, said turning means for said mounting means maintaining said mounting means in its second position when said tape operatively engages said switch means, whereby said idler members tend to move said tape towards said other side edge.

41. A combined lateral spreader and longitudinal guide mechanism for a long tape which is supported by a frame having a longitudinal axis for movement in the general direction of said frame axis under longitudinal tension, said tape being adapted to convey articles of linen and the like on the upper face thereof, said spreader and guide mechanism comprising a pair of longitudinally extending laterally spaced mounting members mounted on said frame, a pair of longitudinally spaced rollers turnably mounted on each said mounting member for movement about respective lateral axes, an endless belt supported by said paired rollers, support means for releasable abutment against the lower face of said tape to maintain said upper face in frictional abutment with said belts, and means for orienting the axes of said mounting members relative to said frame axis whereby to spread laterally articles of linen and the like carried on said upper face of said tape between said tape and said belts, and whereby to shift said tape selectively laterally, said support means comprising a longitudinally and laterally extending support plate, a mounting plate depending from said support plate and extending longitudinally, a laterally and longitudinally extending abutment plate fixed to the lower end of said mounting plate, a lower longitudinal bar, lateral pivots respectively connecting the rear end of said lower bar to said mounting plate and connecting the front end of said lower bar to said frame, an upper longitudinal bar, lateral pivots respectively connecting the rear end of said upper bar to said mounting plate and connecting said upper bar at a point adjacent its front end to said frame, said upper and lower bars being parallel to each other, whereby said support plate is at a fixed angle relative to said belts during movement of said support plate, said support plate being located longitudinally between and spaced from the rear rollers and the front rollers, a longitudinally extending clamping plate freely resting upon said support plate, said clamping plate being upwardly bowed in longitudinal section, said clamping plate having a depending flange, said upper bar carrying socket means for retention of said flange, said flange having limited freedom of longitudinal and transverse movement within said socket means, said clamping plate registering transversely with said belts and with said front and rear rollers, a lever, a lateral pivot connecting an intermediate portion of said lever to said frame and located below said abutment plate, one end portion of said lever being upwardly inclined, a lateral roller carried by said lever end portion and abutting the lower face of said abutment plate, and spring means connecting the other end of said lever to said frame end urging said clamping plate into frictional abutment with the lower face of said tape, said lever being movable against the action of said spring to lower said clamping plate and permit withdrawal of defective articles from between said tape and said belts.

42. A mechanism in accordance with claim 41, said mechanism also comprising an inspection lamp supported by said frame below said tape and forwardly of said support means, and means for energizing said lamp, said tape being translucent whereby articles of linen carried by said tape may be inspected from above by means of the light given off by said lamp, so as to determine which articles are defective and should be withdrawn.

43. In combination, a long conveyor tape, drive means for said tape including an electric motor, a source of voltage, and circuit means including a potentiometer coupling said source of voltage to said motor for operating same, said potentiometer having a reversibly movable arm for varying the voltage supplied to said motor whereby to vary the speed of tape movement and having a pair of stop means which serve as limits to the movement of said potentiometer arm in either of its directions of movement, and a mechanism for varying the position of said potentiometer arm whereby to vary the speed of tape movement, said mechanism comprising a frame, a pair of input members, means coupling said tape to one of said input members for turning said input member at speed proportional to the speed of tape movement and in a direction corresponding to the direction of tape movement, means for independently turning the other input member in a selected direction at a selected rate of speed, output means coupled to each of said input members and adapted to turn at a speed and in a direction dependent upon the difference in the speeds of said input members, an arm mounted on said frame end movable between two end positions, means coupling said output member and said arm, whereby said turning of said output member causes movement of said arm towards a corresponding end position thereof, and means coupling said arm and said power means for causing a resulting change in drum speed such as to tend to cause a reversal in the direction of turning of said output member.

44. A machine for storage of articles of linen and the like and for loading the stored articles upon a moving conveyor, said machine comprising a longitudinal frame, a feeding drum and a loading drum respectively mounted on said frame and having parallel, spaced, lateral axes, a long tape adapted to be wound upon said drums, an electric motor coupled to each said drum, a power supply for said motors, means for coupling said power supply to the loading drum motor for turning said loading drum so as to unwind said tape from said feeding drum and at the same time wind said tape upon said loading drum, whereby articles placed upon said tape between said drums are loaded upon said loading drum between layers of said tape, and for coupling said power supply to the feeding drum for turning said feeding drum so as to unwind said tape from said loading drum and at the same time wind said tape upon said feeding drum, whereby loaded articles are fed onto said conveyor between said drums when said conveyor is positioned relative to said tape for interception of the articles carried thereby, a source of direct voltage for said power supply, a potentiometer having a resistance coil and a reversibly movable contact arm therefor, means for connecting a first terminal of said resistance coil to the positive terminal of said direct voltage source and the second terminal of said resistance coil to the negative terminal of said direct voltage source when said loading drum motor is in operation, means for reversing the connections of said resistance coil to said direct voltage source when said feeding drum motor is in operation, said negative terminal of said direct voltage source and said potentiometer arm being connected to said power supply, whereby movement of said potentiometer arm in one direction causes increase in speed of said loading drum motor when in operation and decreases in speed of said feeding drum motor when in operation, and whereby movement of said potentiometer arm in the other direction causes decrease in speed of said loading drum motor when in operation and increase in speed of said feeding drum motor when in operation, and means for moving said potentiometer arm for motor speed regulation and hence for tape speed regulation.

45. A machine in accordance with claim 44, said potentiometer also having a pair of stop means which serve as limits to the movement of said potentiometer arm in either of its directions of movement, said means for moving said potentiometer arm comprising a lateral support shaft mounted on said frame, two pairs of laterally spaced arms turnably mounted on said support shaft and respectively extending forwardly and rearwardly thereof, means respectively fixedly connecting said forward arms and said rearward arms, front and rear pulley wheels respectively supported by said pairs of arms at a common side thereof and laterally spaced from each other and turnable about respective lateral axes, a lateral shaft turnably mounted on said frame and located longitudinally intermediate said front and rear pulleys, first and second intermediate pulley wheels turnably mounted on said turnable lateral shaft and respectively longitudinally alined with said front and rear pulley wheels, a first pulley belt mounted on said front pulley and said first intermediate pulley, a second pulley belt mounted on said rear pulley and said second intermediate pulley, a front lateral roller turnably mounted between said forward arms, means coupling said front roller to said front pulley, said frame being coupled by means including spring means to said forward arms and said front roller being positioned relative to said tape so that said front roller frictionally engages a face of said tape to drive said first intermediate pulley at a speed proportional to the speed of tape movement and in a direction corresponding to the direction of tape movement, drive means for said second pulley belt which are adapted to be fixed relative to said frame, means for coupling said second pulley belt to the drive means therefor and including means including spring means coupling said frame and said rearward arms and urging movement of said coupling means for said second pulley belt into operative engagement with the drive means therefor, whereby said second intermediate pulley is turned in a direction opposite to the direction of turning of said first intermediate pulley and at a speed proportional to the speed of said drive means for said second pulley belt, a differential mechanism coupling said intermediate pulleys to each other and to said turnable lateral shaft for turning the latter in a direction and at a rate proportional to the difference in the speeds of movement of said intermediate pulleys, and means including a slip clutch coupling said shaft and said potentiometer arm, whereby said turning of said shaft causes corresponding movement of said potentiometer arm towards corresponding stop means, the resulting change in speed of tape movement being operative to tend to cause reversal in the direction of turning of said shaft.

46. A machine in accordance with claim 45, said drive means for said second pulley belt comprising a motor whose speed may be operator-adjusted, a pulley driven by said motor and engaging said second pulley belt, an idler roller carried by said rearward arms and frictionally abutting said second pulley belt to tension same and to hold said second pulley belt frictionally against said motor pulley.

47. A machine in accordance with claim 45, said machine including a further lateral shaft turnably mounted on said rearward arms, a roller fixedly mounted on said further lateral shaft, and said moving conveyor, said moving conveyor being adapted to engage said roller operatively whereby to serve as said drive means for said second pulley belt.

48. A method of storing and drying damp articles of linen and the like and feeding same onto a moving conveyor, comprising unwinding a tape from a first drum and at the same time winding said tape onto a storage drum, placing damp articles of linen and the like successively onto said tape between said drums during the winding of said tape onto said storage drum so that said articles are loaded upon said storage drum between layers of said tape, applying heat to a substantial portion of the periphery of said drum during said loading operation and during storage of said articles upon said drum, then unwinding said tape from said storage drum and at the same time winding said tape onto said first drum, and positioning said tape relative to said conveyor during the unwinding of said tape from said storage drum in such a way that articles carried by said tape from said storage drum are intercepted by said conveyor prior to reaching said first drum, whereby said articles are fed successively onto said conveyor.

49. A machine for storage of articles of linen and the like and for feeding the stored articles upon a moving conveyor, said machine comprising a frame, a first drum and a storage drum respectively mounted upon said frame and having parallel, spaced axes, a long tape adapted to be wound on said drums, drive means for turning said drums at operator-selected speed so as to unwind said tape upon said first drum and at the same time wind said tape upon said storage drum, whereby articles placed upon said tape between said drums are stored upon said storage drum between layers of said tape, heater means supported by said frame externally of said storage drum and positioned and adapted to apply heat to the major portion of the periphery thereof during and after the winding of said tape upon said storage drum, so as to dry the stored articles, and drive means for turning said drums in the opposite direction at a speed adjusted to the speed of the conveyor so as to unwind said tape from said storage drum and at the same time rewind said tape upon said first drum whereby stored articles are fed onto said conveyor between said drums when said conveyor is positioned relative to said tape for interception of the articles carried thereby.

References Cited in the file of this patent

UNITED STATES PATENTS

| | | |
|---|---|---|
| 1,400,645 | Waream | Dec. 20, 1921 |
| 1,540,239 | Barker | June 2, 1925 |
| 1,684,451 | Lowe | Sept. 18, 1928 |
| 2,110,437 | Couch | Mar. 8, 1938 |
| 2,280,573 | Flaws | Apr. 21, 1942 |
| 2,624,138 | Taylor | Jan. 6, 1953 |